(12) United States Patent
Nakahara et al.

(10) Patent No.: US 6,354,087 B1
(45) Date of Patent: Mar. 12, 2002

(54) METHOD AND APPARATUS FOR COOLING SUPERCONDUCTOR

(75) Inventors: Tuneo Nakahara; Kengo Ohkura; Ken-ichi Sato, all of Osaka (JP)

(73) Assignee: Sumitomo Electric Industries, LTD, Osaka (JP)

( * ) Notice: Subject to any disclaimer, the term of this patent is extended or adjusted under 35 U.S.C. 154(b) by 0 days.

(21) Appl. No.: 09/463,235

(22) PCT Filed: May 20, 1999

(86) PCT No.: PCT/JP99/02629

§ 371 Date: Jan. 21, 2000

§ 102(e) Date: Jan. 21, 2000

(87) PCT Pub. No.: WO99/62127

PCT Pub. Date: Dec. 2, 1999

(30) Foreign Application Priority Data

May 22, 1998 (JP) ............................. 10-141389
Jun. 29, 1998 (JP) ............................. 10-182162
Dec. 28, 1998 (JP) ............................. 10-373969

(51) Int. Cl.[7] ................................................ F25B 9/00
(52) U.S. Cl. .......................................................... 62/6
(58) Field of Search .................... 62/6, 51.1; 73/195, 73/196, 197

(56) References Cited

U.S. PATENT DOCUMENTS

| | | | |
|---|---|---|---|
| 3,950,606 A | 4/1976 | Schmidt | 174/15 |
| 4,237,507 A | 12/1980 | Meierovich et al. | 361/19 |
| 4,250,744 A | 2/1981 | Vinokurov et al. | 73/118 |
| 5,430,010 A | 7/1995 | Murakami et al. | 505/450 |
| 5,647,218 A * | 7/1997 | Kuriyama et al. | 62/6 |
| 5,966,944 A * | 10/1999 | Inoue et al. | 62/51.1 |

FOREIGN PATENT DOCUMENTS

| | | |
|---|---|---|
| JP | 64-16568 | 1/1989 |
| JP | 64-28905 | 1/1989 |
| JP | 64-30862 | 2/1989 |
| JP | 64-30863 | 2/1989 |
| JP | 01-153507 | 6/1989 |
| JP | 01-184370 | 7/1989 |
| JP | 03-276775 | 12/1991 |
| RU | 2011129 | 4/1994 |
| RU | 2018200 | 8/1994 |
| RU | 2031329 | 3/1995 |

\* cited by examiner

Primary Examiner—William Doerrler
Assistant Examiner—Malik N. Drake
(74) Attorney, Agent, or Firm—Foley & Lardner

(57) ABSTRACT

A method and an apparatus are provided by which a high temperature superconductor can be cooled to a lower temperature easily and conveniently at a low cost. In the cooling method and apparatus according to the present invention, a high temperature superconductor constituting a cable (50) is cooled by liquid refrigerant (41). The refrigerant (41) is cooled by a refrigerator (10) to or below the freezing point which is given by the refrigerant having a stationary state in the cooling system. The cooled refrigerant is forced to flow and circulated by a pump (34), and such a physical action maintains the refrigerant in a fluid state at a temperature equal to or lower than the freezing point. A viscometer (61) may be used to measure the viscosity of the refrigerant to modulate the flow rate of the refrigerant according to the measured viscosity. According to the present invention, liquid nitrogen is maintained in a fluid state at approximately 45 K, for example.

80 Claims, 29 Drawing Sheets

S : COMPLETE SOLIDIFICATION BOUNDARY

F : VISCOUS FLUID BOUNDARY

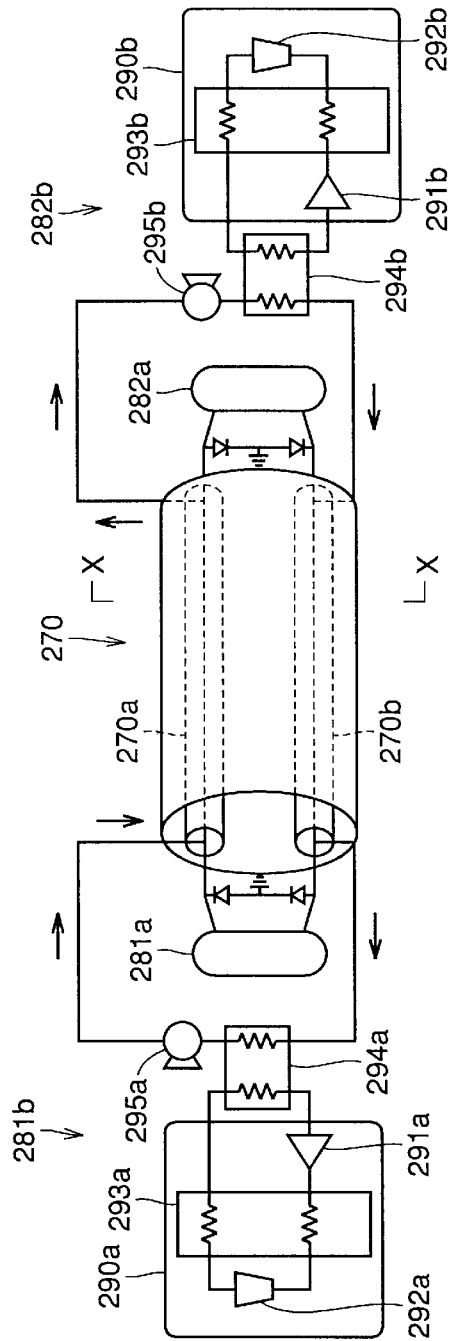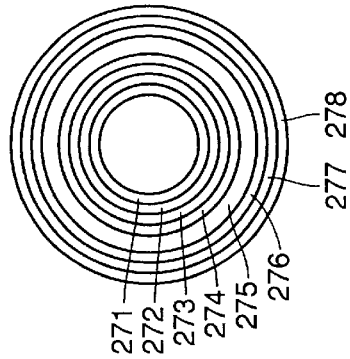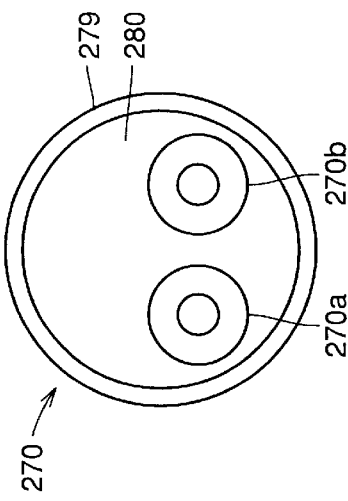

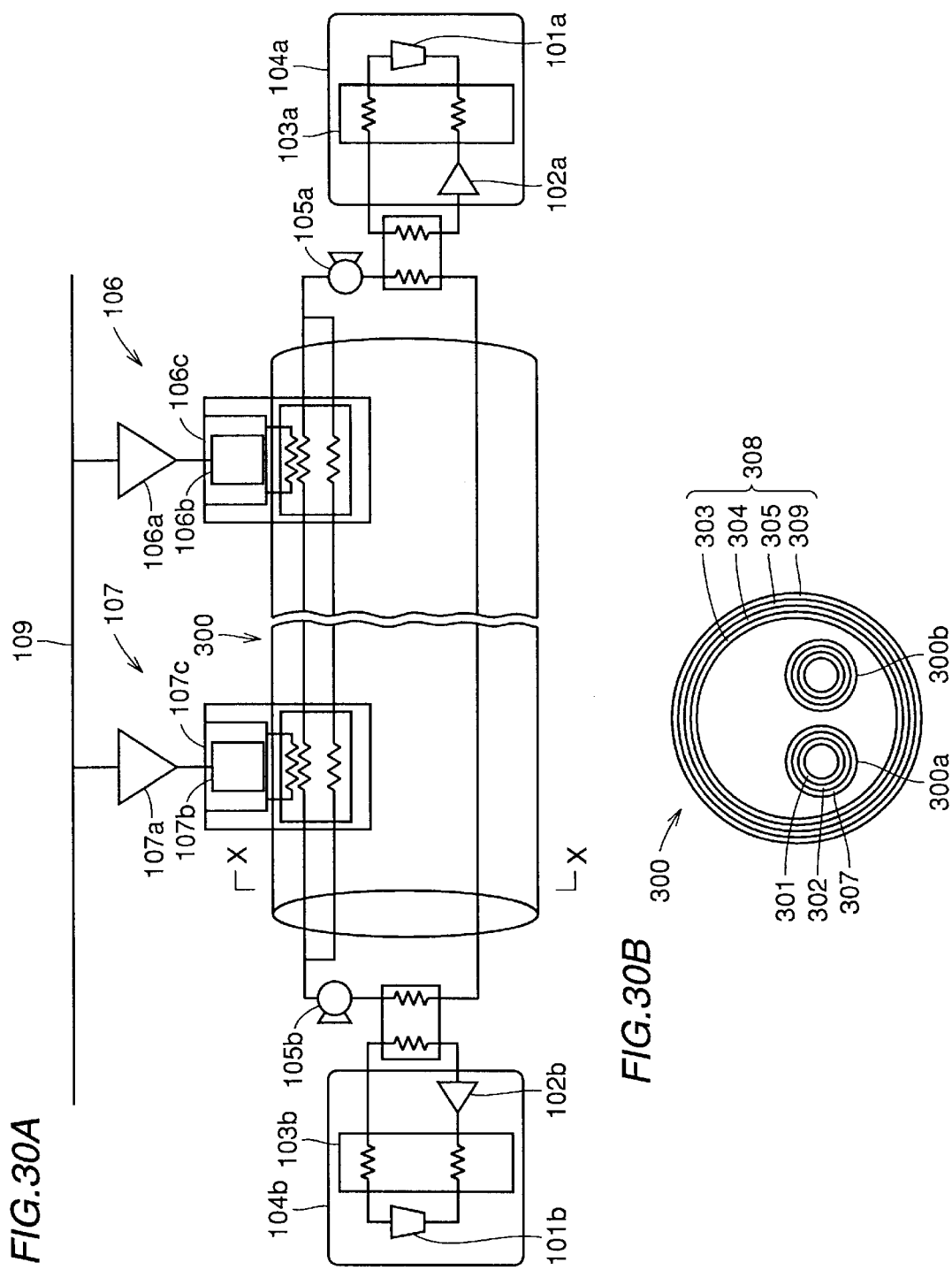

METHOD AND APPARATUS FOR COOLING SUPERCONDUCTOR

TECHNICAL FIELD

The present invention relates to cooling methods and cooling apparatuses for a superconductor, and particularly to a method and an apparatus for cooling a superconductor such as an oxide superconductor having a high critical temperature.

BACKGROUND ART

Various refrigerants have been proposed for cooling a high temperature superconductor, while they cannot afford a complete satisfaction.

Liquid helium is expensive, having an extremely low specific heat at 4.2 K and thus being prone to become gas. The liquid helium used as a refrigerant for energizing does not provide good stability and is apt to generate resistance.

Liquid nitrogen is cheap and has a remarkably higher specific heat at 77 K as compared with that at 4.2 K, and the latent heat of the liquid is high. Therefore, the liquid nitrogen can be used to achieve effective cooling against a slight heat invasion and the stability when electric current is applied is high. However, due to the high boiling point of 77 K of the liquid nitrogen, conventional cables and magnets, which are designed to be cooled by the liquid nitrogen, cannot have a sufficiently high current density. The liquid nitrogen may be employed under a reduced pressure or a refrigerator may be employed to cool the liquid nitrogen, for example, in order to cool a high temperature superconductor below 77 K. However, nitrogen becomes a solid at 101,325 $Nm^{-2}$ (1 atm), 63.2 K. The solid nitrogen is relatively inferior in heat conduction and thus cooling efficiency could be impaired. In addition, cooling at approximately 63 K is not completely satisfactory. The critical current of a high temperature superconductor at 63 K could be about twice that at 77 K, but, consideration should be given to heat invasion to the superconductor. Even if any part of the superconductor reaches 63 K, the remaining part would attain a remarkably higher temperature than 63 K due to heat invasion. In this case, a part having the highest temperature limits the critical current of the entire superconductor.

Other refrigerants with its boiling point lower than 77 K include liquid hydrogen whose boiling point is 20 K. However, the hydrogen is explosive. Liquid neon having a boiling point of 27 K is a scarce material and thus very expensive, therefore, it is not generally applicable. Liquid oxygen has a relatively high boiling point of 90.2 K, while it has a relatively low freezing point of 54.3 K, and accordingly the liquid oxygen could be used together with a refrigerator for cooling it with the liquid form maintained. However, the liquid oxygen is explosive similarly to the liquid hydrogen. Additionally, a mixture of oxygen and nitrogen is proposed in Cryogenics 35 (1995) 387–391 as a refrigerant for cooling a high temperature superconductor at or below a liquid nitrogen temperature.

If a high temperature superconductor has a critical current density (Jc) of approximately 30,000 $A/cm^2$ at the liquid nitrogen temperature, the occupying ratio of a superconducting wire in the cross section of a cable could be reduced and thus practical application could be expected. At present, however, a general high temperature superconducting wire has Jc of approximately 15,000 $A/cm^2$. It is thus difficult by using such a wire to obtain a superconducting cable which is compact enough relative to the conventional normal conducting cable.

DISCLOSURE OF INVENTION

One object of the present invention is to provide a method and an apparatus by which a superconductor can be cooled to a lower temperature simply and conveniently at a low cost.

Another object of the present invention is to provide a method and an apparatus by which a large-scale high-Tc superconductor can be cooled safely at a lower cost.

The present invention is directed to a method of cooling a superconductor by a refrigerant, which includes the steps of cooling the refrigerant to or below a freezing point which is given by the refrigerant having a stationary state in the cooling system for the superconductor, maintaining the refrigerant system in a fluid state by a physical action on the refrigerant cooled to or below the freezing point, and cooling the superconductor by the refrigerant system in the fluid state to or below the critical temperature of the superconductor.

The method according to the present invention may further include the steps of measuring viscosity of the refrigerant and modulating flow rate of the refrigerant system in the fluid state according to the measured viscosity. The viscosity may be evaluated by the load applied to a stirring motor which is stirring the refrigerant.

In the method according to the present invention, the physical action on the refrigerant for maintaining the fluid state of the refrigerant system may be stirring of the refrigerant, transfer or circulation of the refrigerant via a pump, convection of the refrigerant in a vessel, or any combination thereof.

In a preferred embodiment of the present invention, the physical action on the refrigerant for maintaining the fluid state of the refrigerant system is stirring of the refrigerant in a vessel holding it and/or transfer or circulation of the refrigerant via a pump. The refrigerant may be cooled by a refrigerator or a refrigerating system, and the refrigerant system in the fluid state at or below the freezing point may be sent by the pump through a piping system from the vessel to a part in which the superconductor is housed.

In the present invention, the refrigerant may be selected from the group consisting of liquid nitrogen and a mixture of liquid nitrogen and solid nitrogen. The refrigerant may also be selected from the group consisting of liquid air and a mixture of liquid air and solid air. The refrigerant may further be selected from the group consisting of a mixture of liquid oxygen and liquid nitrogen and a mixture of liquid oxygen, liquid nitrogen and a solidified matter of at least one of the liquid oxygen and liquid nitrogen.

In the present invention, the superconductor may constitute at least one selected from the group consisting of an oxide high temperature superconducting cable, an oxide high temperature superconducting magnet, and an oxide high temperature superconducting device. If the superconductor constitutes the oxide high temperature superconducting cable, the step of cooling the refrigerant is preferably carried out at a plurality of places in the cooling system of the oxide high temperature superconducting cable.

In the present invention, the superconductor may be a part of a device selected from the group consisting of a transformer, a linear motor car, an SMES, an MRI, an SQUID, a logic circuit and a current limiter. In this case, the refrigerant can be sent from a cooling system independent of an operation unit of the device to the operation unit via a piping system.

The cooling method according to the present invention may further include the steps of liquefying air by a refrigerator, circulating the liquefied air while cooling it, and cooling the superconductor by the liquefied air which is cooled and circulated. The circulation of the liquefied air may be circulation by mechanical means such as a pump or the like, or convection of the liquefied air held in a vessel. The circulation may further be a cycle between vaporization of the liquefied air and condensation of the vaporized air by cooling it.

In the present invention, the refrigerator may employ a refrigerating cycle in which gas is compressed and expanded. The gas circulated in the refrigerating cycle may cool and condense air. Further, the gas expanded in the refrigerating cycle may cool the liquefied air which is circulated and cool the air for its condensation. The refrigerating cycle may be Brayton cycle. The gas used in the refrigerating cycle may be helium gas.

In the present invention, if the air is liquefied, a gaseous material which solidifies at a temperature higher than the liquefying temperature of the air is preferably removed from the air, and the air thus obtained is liquefied by the refrigerator. Any material for lowering the freezing point of the liquefied air may be added to the liquefied air. The material for lowering the freezing point may be petroleum-based organic solvent or zeolite. Liquid oxygen may be added to the liquefied air to use the resulting refrigerant mixture for cooling a superconductor. A cooling storage type refrigerator may be used to condense the air and/or cool the liquefied air which is circulated.

The present invention is further directed to an apparatus for cooling a superconductor by a refrigerant, which includes a refrigerating apparatus or a refrigerating system for cooling the refrigerant to or below a freezing point which is given by the refrigerant having a stationary state in the cooling system for the superconductor, means for allowing the cooled refrigerant to flow, means for measuring viscosity of the refrigerant, and means for modulating fluid state of the refrigerant according to the measured viscosity. The means for allowing the refrigerant to flow may be at least one selected from the group consisting of a pump and a stirring machine.

The cooling apparatus according to the present invention may further include a refrigerator having a cryogenic part exhibiting a temperature lower than the liquefying temperature of the air, a liquefied air storage vessel in which at least a part of the cryogenic part is housed, a first piping system for discharging the liquefied air stored in the vessel therefrom, a second piping system for directing the discharged liquefied air to the superconductor and circulating the liquefied air, and means placed at the second piping system for cooling the liquefied air supplied to the superconductor. A valve may be placed at the first piping system and a pump may be placed at the second piping system for feeding the liquefied air.

The refrigerator for cooling the air may employ a refrigerating cycle in which gas is circulated through its compression and expansion. In this case, a heat exchanger for cooling the liquefied air and/or the liquefied air storage vessel may be placed at the cryogenic part of the refrigerator through which the expanded gas passes. The refrigerating cycle may be Brayton cycle. The gas used in the refrigerating cycle may be helium gas. Preferably, a purifying unit is placed at a system for supplying air to the liquefied air storage vessel in order to remove from the air a gaseous material which solidifies at a temperature higher than the liquefying temperature of the air. A heat exchanging fin is preferably placed at the cryogenic part of the refrigerator housed in the liquefied air storage vessel. Preferably, a heater is placed at the cryogenic part of the refrigerator housed in the liquefied air storage vessel in order to melt or sublimate any solidified matter attaching to the cryogenic part. Further, an exhausting unit is connected to the liquefied air storage vessel for discharging the melt or sublimate. The cooling apparatus according to the present invention may further include means for injecting into the vessel an additive for lowering the freezing point of the liquefied air, and means for stirring the liquefied air containing the additive. Means for introducing liquid oxygen into the vessel may further be included. In order to condense the air in the vessel, a cooling stage of a cooling storage type refrigerator may be placed in the vessel, and a cooing stage of a cooling storage type refrigerator may be placed at the second piping system in order to cool the liquefied air.

The cooling apparatus according to the present invention may further include a refrigerator having a cryogenic part exhibiting a temperature lower than the liquefying temperature of the air, and a vessel in which at least a part of the cryogenic part and a superconductor to be cooled are simultaneously housed. The vessel holds the liquefied air for cooling the superconductor, and convection of the liquefied air occurs between the cryogenic part and the superconductor in the vessel or vaporization of the liquefied air and condensation of the vaporized air by the cryogenic part occur in the vessel. The refrigerator may be any of Brayton cycle type, Stirling type, GM type and Solvay type, or any combination thereof. The refrigerator may employ a refrigerating cycle in which gas is circulated through its compression and expansion. A heat exchanger for cooling the liquefied air may be placed at the cryogenic part of the refrigerator through which expanded gas passes. The cooling apparatus preferably includes a purifying unit for removing from the air a gaseous material which solidifies at a temperature higher than the liquefying temperature of the air. Preferably, a heat exchanging fin is placed at the cryogenic part in the vessel. A heater may be placed at the cryogenic part in the vessel, and an exhausting unit may be connected to the vessel. The cooling apparatus may further include means for injecting into the vessel an additive for lowering the freezing point of the liquefied air, and means for stirring the liquefied air containing the additive. The cooling apparatus may further include means for introducing liquid oxygen into the vessel.

The present invention is directed to a method of using liquefied air to cool a superconductor, which includes the steps of liquefying air by a refrigerator, circulating the liquefied air while cooling it, and cooling the superconductor by the liquefied air which is cooled and circulated. The circulation of the liquefied air may be generated by transfer by mechanical means such as a pump or the like, or generated by convection of the liquefied air held in a vessel. The circulation may be a cycle between vaporization of the liquefied air and condensation of the vaporized air by cooling it. The refrigerator may employ a refrigerating cycle in which gas is compressed and expanded. The gas circulated in the refrigerating cycle can cool and condense the air. The gas expanded in the refrigerating cycle may be used to cool the circulated liquefied air and cool the air to condense it. The refrigerating cycle may be Brayton cycle. The gas used in the refrigerating cycle may be helium gas. Preferably, the cooling method further includes the step of removing from air a gaseous material which solidifies at a temperature higher than the liquefying temperature of the air, and the resulting air is preferably liquefied by the refrigerator. A material for lowering the freezing point of the liquefied air may be added to the liquefied air. The material for lowering the freezing point may be petroleum-based organic solvent or zeolite. The cooling method may further include the step of adding liquid oxygen to the liquefied air, and the resulting refrigerant mixture is used for cooling a superconductor. By a cooling storage type refrigerator, air can be condensed and/or the circulated liquefied air can be cooled.

The present invention is directed to an apparatus using liquefied air to cool a superconductor, which includes a refrigerator having a cryogenic part exhibiting a temperature lower than liquefying temperature of the air, a liquefied air storage vessel in which at least a part of the cryogenic part is housed, a first piping system for discharging liquefied air stored in the vessel therefrom, a second piping system for directing the discharged liquefied air to the superconductor and circulating the liquefied air, and means placed at the second piping system for cooling the liquefied air supplied to the superconductor. In this apparatus, a valve may be placed at the first piping system and a pump may be placed at the second piping system for feeding the liquefied air. The refrigerator may employ a refrigerating cycle in which gas is circulated through its compression and expansion. Preferably, a heat exchanger for cooling the liquefied air and/or the liquefied air storage vessel are/is placed at the cryogenic part of the refrigerator through which the expanded gas passes. The refrigerating cycle may be Brayton cycle. The gas used in the refrigerating cycle may be helium gas. Preferably, a purifying unit is placed at a system for supplying air to the liquefied air storage vessel in order to remove from the air a gaseous material which solidifies at a temperature higher than the liquefying temperature of the air. Further, a heat exchanging fin is preferably placed at the cryogenic part of the refrigerator which is housed in the liquefied air storage vessel. A heater may further be placed at the cryogenic part of the refrigerator housed in the liquefied air storage vessel, and an exhausting unit may be connected to the liquefied air storage vessel. The cooling apparatus may further include means for injecting into the vessel an additive for lowering the freezing point of the liquefied air, and means for stirring the liquefied air containing the additive. The cooling apparatus may further include means for introducing liquid oxygen into the vessel. In order to condense the air in the vessel, a cooling stage of a cooling storage type refrigerator may be placed in the vessel, and a cooling stage of a cooling storage type refrigerator may be placed at the second piping system in order to cool the liquefied air.

Another cooling apparatus for a superconductor according to the present invention includes a refrigerator having a cryogenic part exhibiting a temperature lower than liquefying temperature of air, and a vessel which simultaneously houses at least a part of the cryogenic part and a superconductor to be cooled, wherein the vessel holds liquefied air for cooling the superconductor, and convection of the liquefied air occurs in the vessel between the cryogenic part and the superconductor or vaporization of the liquefied air and condensation of the vaporized air by the cryogenic part occur in the vessel. The refrigerator may be any of Brayton cycle type, Stirling type, GM type and Solvay type, or any combination thereof. The refrigerator may use a refrigerating cycle in which gas is circulated through its compression and expansion. A heat exchanger for cooling the liquefied air may be placed at the cryogenic part of the refrigerator through which expanded gas passes. Further, the cooling apparatus preferably includes a purifying unit for removing from the air a gaseous material which solidifies at a temperature higher than liquefying temperature of the air. A heat exchanging fin may be placed at the cryogenic part in the vessel. A heater may be placed at the cryogenic part in the vessel and an exhausting unit may be connected to the vessel. The cooling apparatus may further include means for injecting into the vessel an additive for lowering freezing point of the liquefied air, and means for stirring the liquefied air containing the additive. The cooling apparatus may further include means for introducing liquid oxygen into the vessel.

BRIEF DESCRIPTION OF DRAWINGS

FIG. 27A schematically illustrates an embodiment of the cooling system for a DC cable according to the present invention.

FIG. 27B is a schematic cross sectional view of a cable used in the system shown in FIG. 27A.

FIG. 27C is a schematic cross sectional view of one of the conductors included in the cable in FIG. 27B.

FIG. 30A schematically illustrates a further embodiment of the cooling system for a DC cable according to the present invention.

FIG. 30B is a schematic cross sectional view of a cable used in the system in FIG. 30A.

BEST MODE FOR CARRYING OUT THE INVENTION

Figure 1:
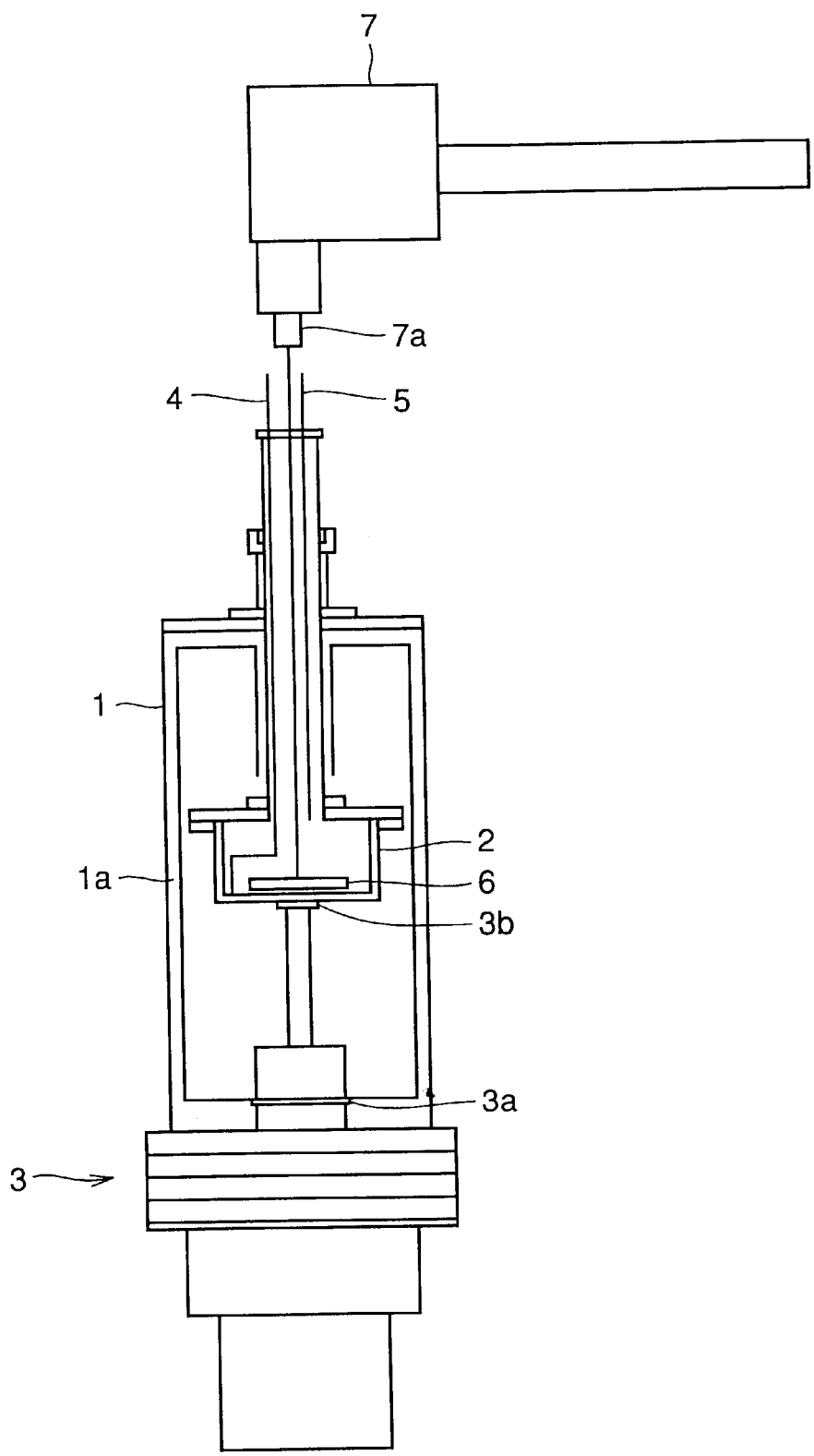
FIG. 1 schematically illustrates an apparatus for examining the relation between temperature and fluidity of a refrigerant.

The inventors of the present invention have found by an experiment using the apparatus as shown in FIG. 1 that a fluid refrigerant can be cooled to a considerably low temperature without solidification thereof by forcing the fluid refrigerant to flow at a predetermined flow rate. Referring to FIG. 1, a copper vessel 2 for holding a refrigerant is placed in a vacuum thermal insulating vessel 1 having therein a thermal shield 1a. A GM refrigerator 3 is attached to thermal insulating vessel 1. A first stage 3a of GM refrigerator 3 is arranged at the bottom of thermal insulating vessel 1 and a second stage 3b is attached to the bottom of copper vessel 2. The refrigerant is introduced into copper vessel 2 via a pipe 4. The refrigerant held in copper vessel 2 is cooled by the second stage 3b of GM refrigerator 3. A pipe 5 for discharging gas is inserted into copper vessel 2. Further, a stirring screw 6 for forcing the refrigerant to flow is arranged in copper vessel 2 and attached to a strut 7a of a motor 7 which rotates screw 6.

Figure 2:
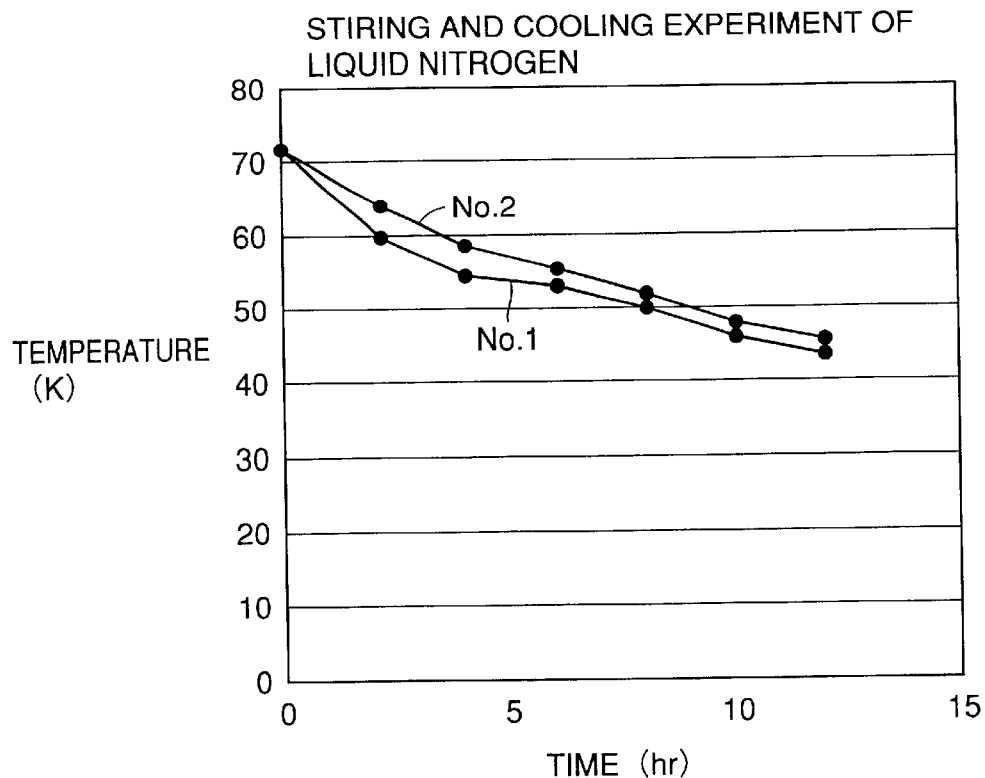
FIG. 2 illustrates a result of experiment using the apparatus shown in FIG. 1.
Figure 3:
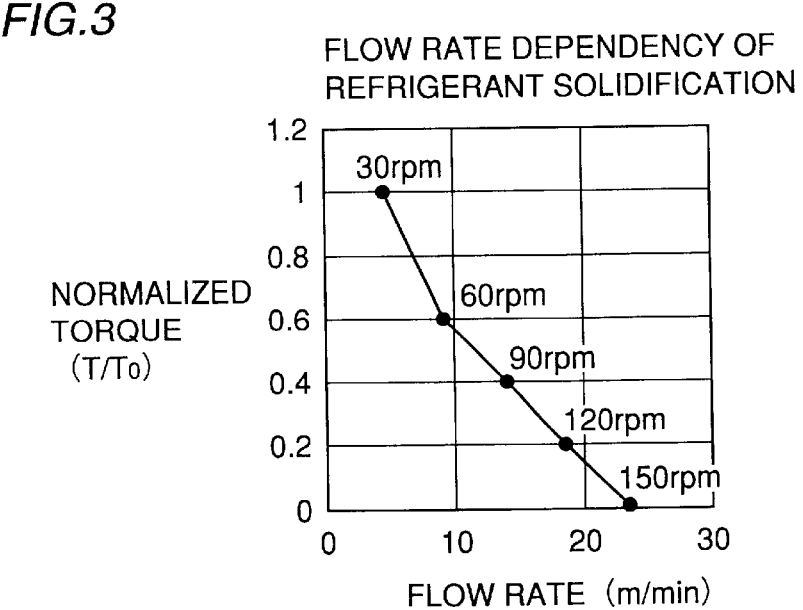
FIG. 3 illustrates a result of measurement of fluid state of nitrogen at 45 K by the apparatus shown in FIG. 1.

In this apparatus, liquid nitrogen was introduced into copper vessel 2 through pipe 4 while air is discharged through gas discharge pipe 5 at a temperature around 77 K. Then, motor 7 rotated stirring screw 6 at 150 rpm so as to stir the liquid nitrogen. With stirring continued, the refrigerator lowered the temperature of the liquid nitrogen. A change in the temperature of the liquid nitrogen in this period is shown in FIG. 2. In this drawing, No. 1 indicates temperature by a thermocouple at the bottom portion of the refrigerant, and No. 2 indicates temperature by a thermocouple at the upper portion of the refrigerant. When the liquid nitrogen was cooled without stirring thereof, the liquid nitrogen became solid at 63 K. When the liquid nitrogen was stirred, the nitrogen did not become solid completely even at 45 K and maintained its fluid state. A silver-sheathed bismuth-based 2223-phase oxide superconducting wire (thickness: 0.24 mm, width: 3.8 mm, length: 50 mm) was placed in the nitrogen flowing at 45 K, and the critical current (Ic) thereof was measured. This wire having an Ic of 30 A at 77 K exhibited an Ic of 150 A at 45 K, which was five times as high as that at 77 K. While the copper vessel was kept at 45 K, the rotational speed of the screw was decreased and the state of the nitrogen was examined. In the experiment, a torque motor was used for rotating the screw, and the torque applied to the motor was measured while the rotational speed was reduced. FIG. 3 shows the result. In this drawing, the axis of ordinate represents the ratio of torque (T) at each rotational speed to the torque (T0) at the rotational speed of 30 rpm, and the axis of abscissa represents the flow rate of nitrogen. When the rotational speed became equal to or lower than 150 rpm (at most the flow rate of 23 m/min), the rotational torque increased and the fluidity of the nitrogen decreased. When the rotational speed reached 30 rpm (flow rate of 4.7 m/min), solidification occurred during rotation. Accordingly, it was found that the fluidity of nitrogen may be maintained by flowing the nitrogen at 23 m/min or more, even if the nitrogen was cooled to 45 K.

Figure 4:
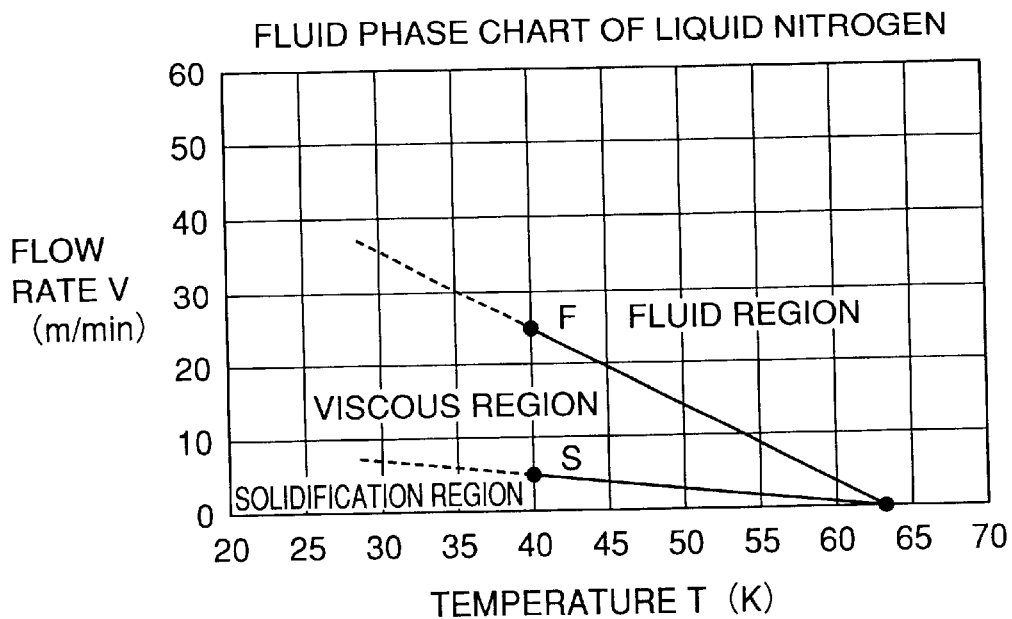
FIG. 4 illustrates the relation between fluid state and temperature of nitrogen.

FIG. 4 illustrates a fluid phase chart of nitrogen with parameters of temperature and flow rate. Line S is a complete solidification boundary. Under the region below line S, the nitrogen is substantially in a solid state. Line F is a viscous fluid boundary and the nitrogen exists in a fluid state having a considerably high viscosity between lines S and F. In the region above line F, the nitrogen can freely flow.

Figure 5:
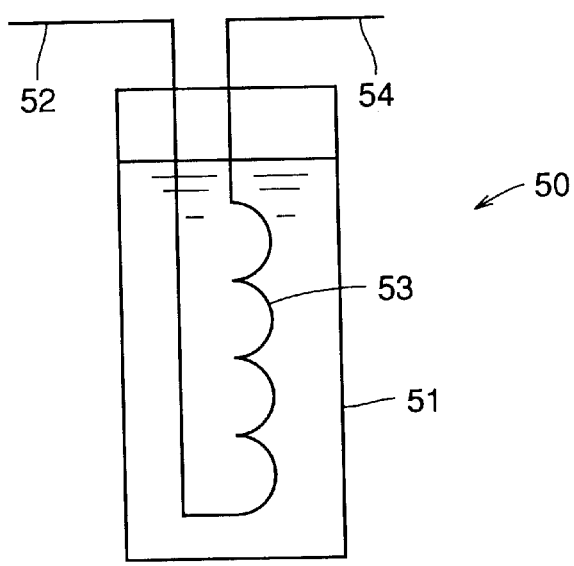
FIG. 5 schematically illustrates a structure of an air purifying unit.
Figure 6:
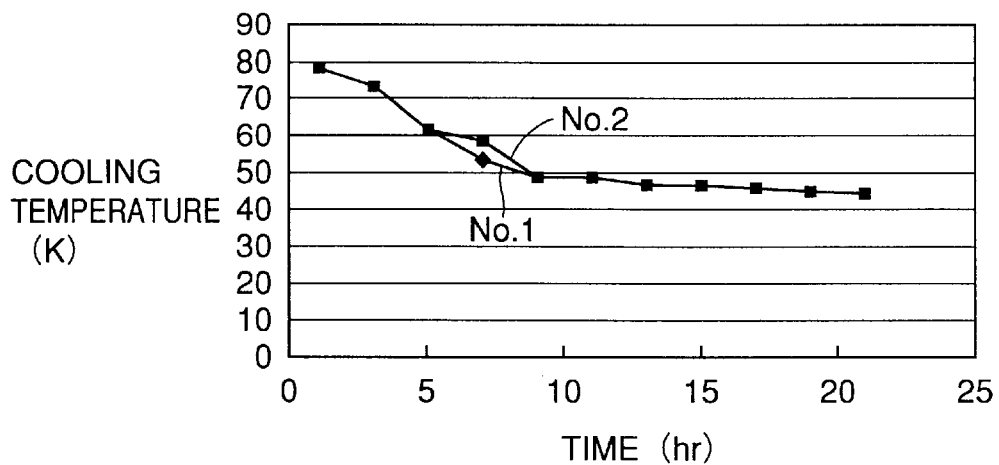
FIG. 6 illustrates passage of time with which liquid air is cooled.
Figure 7:
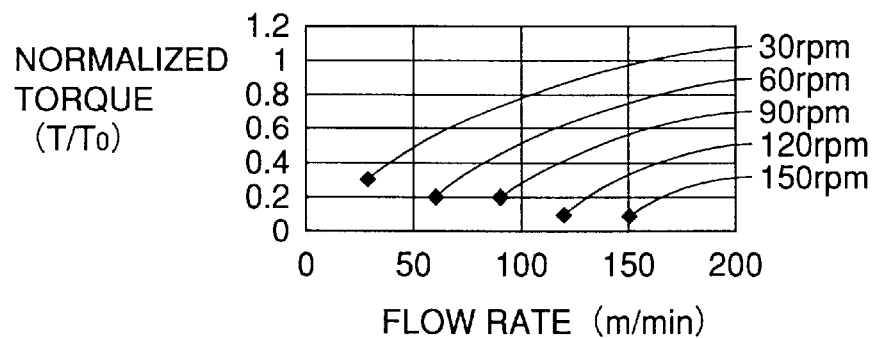
FIG. 7 illustrates the viscosity of liquid air which is stirred at a predetermined flow rate and at approximately 45 K.

Further, the relation between temperature and fluidity concerning liquid air was examined according to the procedure described below. The copper vessel was attached to the second stage of the refrigerator and the refrigerator was operated to cool the vessel. Using an air purifying unit 50 as shown in FIG. 5, carbonic acid gas and water which were contained in the air and had a relatively high freezing point of at least 100 K were removed in advance. In air purifying unit 50, a piping 52 for taking in material air was introduced into a vessel 51 holding liquid nitrogen. Piping 52 was received in vessel 51 and connected to a pipe or silicone tube 53 filled with adsorbent. Molecular sieve was employed as the adsorbent. The air purified through the adsorbent was sent to the copper vessel attached to the refrigerator via a piping 54. A valve was attached to gas inlet 4 of the apparatus shown in FIG. 1, it was confirmed that the inside copper vessel was cooled to 80 K or less, and thereafter the valve was opened to introduce the preliminary cooled and purified air into the copper vessel. According to the principle of the cryopump, the air flew into the copper vessel and was condensed on the surface of the copper vessel. Condensation of the air was advanced to obtain 500 ml of liquefied air. Then, the valve was closed and rotation of screw 6 by motor 7 was started. Stirring was started at a rotational speed of 150 rpm. While the stirring was continued, the temperature of the entire copper vessel was decreased to 45 K by the refrigerator. FIG. 6 illustrates the cooling process. In FIG. 6, No. 1 indicates temperature of a thermocouple attached to the bottom of the vessel, and No. 2 indicates temperature of a thermocouple attached to the upper surface of the vessel. Rotation of the screw was maintained at 45 K and no solidification of the liquid air was proved. In the cooled state, pressurized nitrogen gas was then introduced from pipe 5 to discharge the contents of the copper vessel via the valve attached to pipe 4. The discharged 500 ml of liquefied air did not contain any small solidified matters. Next, according to the procedure described above, 500 ml of liquefied air which had been purified was stored again in the copper vessel. The entire vessel was cooled to 45 K and torque applied to the stirring motor was measured by changing the stirring speed. The result is illustrated in FIG. 7. As shown in FIG. 7, the motor torque just changed slightly as to the stirring speed of 30 to 150 rpm (flow rate of 30 to 150 m/min). No tendency to solidify was found at 30 rpm. Since the liquid air was a mixed system mainly composed of liquid nitrogen and liquid oxygen, it was considered that transition of the liquid air to a solid phase did not easily occur compared with liquid nitrogen. Such a refrigerant mixture having a low viscosity can advantageously be used to cool a superconducting cable on which pressure loss of refrigerant gives an adverse effect.

In the present invention, liquid nitrogen, a mixture of liquid nitrogen and solid nitrogen, liquid air, a mixture of liquid air and solid air, a mixture of liquid oxygen and liquid nitrogen, or a mixture of liquid oxygen, liquid nitrogen and at least one of a solidified matter of oxygen and a solidified matter of nitrogen can preferably be used as the refrigerant. According to the present invention, the air in the atmosphere may be liquefied by a refrigerator, the liquefied air may be cooled and circulated, and the superconductor may be cooled by the liquefied air being cooled and circulated.

According to the present invention, the fluid state and temperature of the refrigerant may be set to comply with use. Generally, the higher the viscosity of the flowing refrigerant, the state of the refrigerant approaches the solidified state. In this case, the viscosity can be decreased by raising the flow rate of the refrigerant. The fluid state of the refrigerant can be maintained by monitoring the viscosity of the refrigerant and modulating the flow rate accordingly. In some cases, a refrigerant of a slightly high viscosity in which fine solids exist may be employed. Such a refrigerant containing the solids can have a higher heat capacity and may be suitable for cooling a superconducting magnet. On the other hand, a refrigerant of a low viscosity is appropriate for cooling a superconducting cable in which pressure loss occurs when the refrigerant is circulated.

Figure 8A:
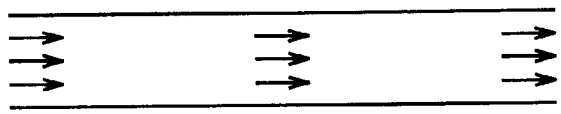
FIGS. 8A to 8D schematically illustrate the physical actions for maintaining a supercooled liquid refrigerant in a fluid state.
Figure 8B:
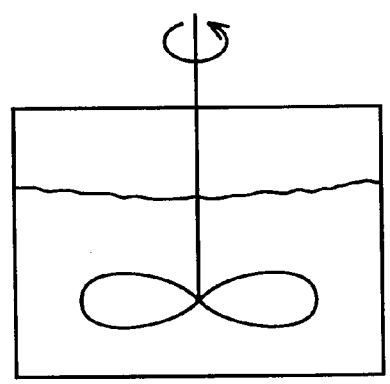
Figure 8C:
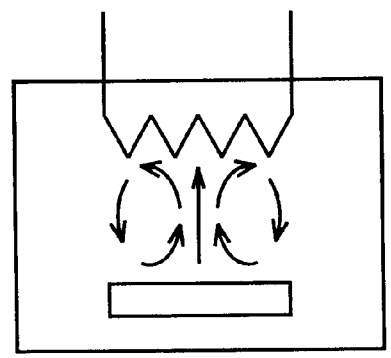
Figure 8D:
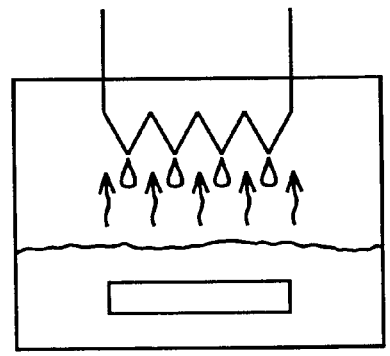

According to the present invention, the refrigerant is cooled to a temperature equal to or lower than the freezing point which is given by the refrigerant in a stationary state. Physical action is exerted on the refrigerant cooled to that temperature, and accordingly the refrigerant maintains its fluid state in the system for cooling a superconductor. Generally, the physical action for maintaining the fluid state is forcible transfer of the refrigerant in a vessel or tube as shown in FIG. 8A, stirring of the refrigerant in a vessel as shown in FIG. 8B, or combination thereof The forcible transfer is generally accomplished by mechanical means such as a pump or the like. The forcible transfer includes transfer of the refrigerant in a predetermined direction, circulation of the refrigerant, and the like. Forcible stirring includes mechanical stirring by a screw or the like, stirring by ultrasonic waves, and the like. Convection as shown in FIG. 8C may also be the physical action capable of maintaining the fluid state. The convection occurs between a low temperature part and a high temperature part of the refrigerant. For example, convection of the refrigerant can be generated between a cooling head of a cooling apparatus and a superconductor. The cooled refrigerant moves in the direction of the gravity, and the refrigerant absorbing heat moves in the direction opposite to the gravity. In addition, the fluid state may be maintained by a cycle of vaporization and condensation as shown in FIG. 8D. The refrigerant which cools the superconductor is vaporized by heat energy from the superconductor. The vaporized refrigerant is cooled by the cooling apparatus and accordingly condensed. The condensed refrigerant is returned to the superconductor.

According to the present invention, a refrigerator preferably used to cool the refrigerant may have a refrigerating cycle in which gas is compressed and expanded. The gas circulated in the refrigerating cycle can cool the refrigerant. Such a refrigerating cycle may be Brayton cycle, for example. The gas used in the refrigerating cycle may be helium gas, for example.

According to the present invention, when air is liquefied, preferably, a gaseous material which may be solidified at a temperature higher than the liquefying temperature of the air is removed from the air and then the resultant air is liquefied by the refrigerator. In the present invention, a material for lowering the freezing point of the refrigerant can be added to the refrigerant. As the material for lowering the freezing point, petroleum-based organic solvent such as a mixture of propane and isopentane, zeolite or the like can be used. In the present invention, a superconductor can be cooled by a refrigerant mixture obtained by adding liquid oxygen to the liquefied air. The freezing point of the refrigerant can be modulated by changing the ratio between nitrogen and oxygen in the liquefied air.

According to the present invention, the refrigerant may be cooled by a cooling storage type refrigerator including a Stirling type refrigerator, a GM refrigerator, and Solvay type refrigerator, which has a refrigerating cycle carrying out compression and expansion of helium gas in a cylinder. The air may be liquefied by such a cooling storage type refrigerator.

When the air is liquefied, a cooling apparatus for a superconductor can include a refrigerator having a cryogenic part exhibiting a temperature lower than the liquefying temperature of the air, a liquefied air storage vessel housing therein at least a part of the cryogenic part and the superconductor, a first piping system for discharging liquefied air stored in the vessel, a second piping system for directing the discharged liquefied air to the superconductor and circulating the liquefied air, and means placed at the second piping system for cooling the liquefied air supplied to the superconductor. The cooling apparatus can further include means for measuring the viscosity of the liquefied air, and means for modulating the fluid state of the liquefied air according to the measured viscosity. In such an apparatus, a valve can be placed at the first piping system, and a pump can be placed at the second piping system for feeding the liquefied air. In the apparatus using the liquefied air, the refrigerator can employ a refrigerating cycle in which gas is circulated through compression and expansion thereof. A heat exchanger for cooling the liquefied air and/or the liquefied air storage vessel can be placed at the cryogenic part of the refrigerator through which expanded gas passes. Such a refrigerating cycle may be Brayton cycle, for example. Helium gas may be used in the refrigerating cycle. Alternatively, another liquefied air storage tank only for generating liquefied air may separately be provided and the liquefied air generated at a cryogenic part of another refrigerator may be transported to the liquefied air storage vessel in which the superconductor is held.

In the apparatus using the liquefied air, a purifying unit can be placed at the system for supplying the air so as to remove from the air a gaseous material which solidifies at a temperature higher than the liquefying temperature of the air. A heat exchanging fin is preferably placed at the cryogenic part of the refrigerator housed in the liquefied air storage vessel.

In the apparatus using the liquefied air, a heater can be placed at the cryogenic part of the refrigerator housed in the liquefied air storage vessel, and an exhausting unit can be connected to the liquefied air storage vessel. The liquefied air storage vessel can include means for injecting an additive into the vessel for lowering the freezing point of the liquefied air, and means for stirring the liquefied air containing the additive. The liquefied air storage vessel can further include means for introducing liquid oxygen.

In order to condense the air within the liquefied air storage vessel containing the superconductor, a cooling stage of a cooling storage type refrigerator including a Stirling type, GM type and Solvay type can be placed in the vessel. In order to cool the liquefied air, such a cooling stage of the cooling storage type refrigerator can be connected to the second piping system.

According to the present invention, a system can be provided for cooling an oxide high temperature superconductor such as an yttrium-based one, a bismuth-based one, or the like to a temperature not higher than 63 K, preferably in the range from 45 K to 60 K. In particular, the present invention is applied to a method and a system for cooling a superconductor having a critical temperature not lower than 77 K by a refrigerant which predominantly has a liquid phase at 101,325 $Nm^{-2}$ (1 atm). According to the present invention, a superconductor can be cooled to a temperature from 40 K to 63 K, preferably from 45 K to 60 K under an atmosphere of 101,325 $Nm^{-2}$ (1 atm). The flow rate of the refrigerant in a fluid state is at least 30 m/min, preferably at least 50 m/min, and more preferably at least 100 m/min. In such a system, a high temperature superconductor is in the form of, for example, a superconducting wire such as a bismuth-based silver-sheathed wire, a superconducting magnet coil using it, a cable conductor using it, or the like. Such a system is applied to large capacity power transmission, storage, conversion, high magnetic field generation, and the like. Further, the present invention is applied to a transformer, a linear motor car, an SMES, an MRI, an SQUID, a logic circuit, a current limiter, and the like.

Figure 9:
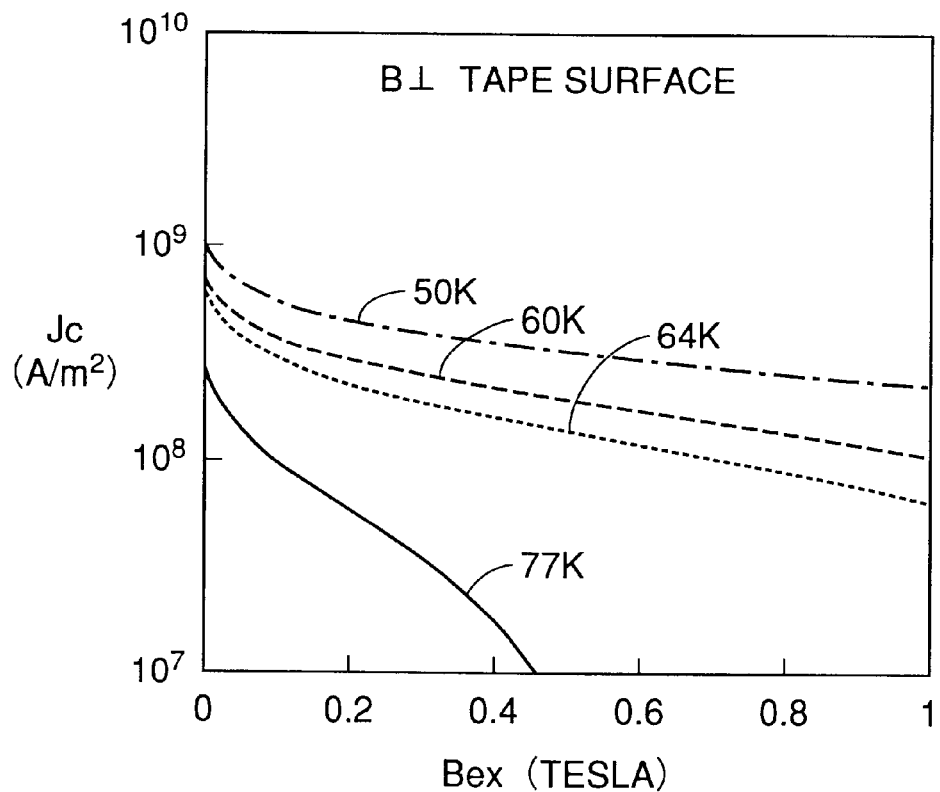
FIG. 9 illustrates Jc characteristic of a bismuth 2223-based silver-sheathed tape at various cooling temperatures.

According to the present invention, when an oxide high temperature superconductor is cooled to a temperature equal to or lower than 60 K, for example, in the range from 45 K to 60 K or from 50 K to 60 K, the obtained critical current density (Jc) can be at least about twice to three times as high as that obtained at 77 K. FIG. 9 illustrates Jc characteristic of a tape wire formed of a bismuth-based 2223-phase oxide superconductor covered with a silver sheath. At a cooling temperature of 77 K, the achieved Jc is just approximately 30,000 $A/cm^2$, while a Jc of at least 90,000 $A/cm^2$ can be achieved at a cooling temperature equal to or lower than 60 K. Such a high Jc is practically useful. The higher Jc enables a cable to be compact so that a power cable of a larger capacity can be implemented. Cooling at a temperature equal to or lower than 60 K increases the temperature margin, and accordingly transition to the normal conduction is more effectively restricted to enhance operational stability. Further, energy loss generated during electric power transmission can be decreased by cooling at 60 K or less, and thus energy saving effect can be expected.

Figure 10:
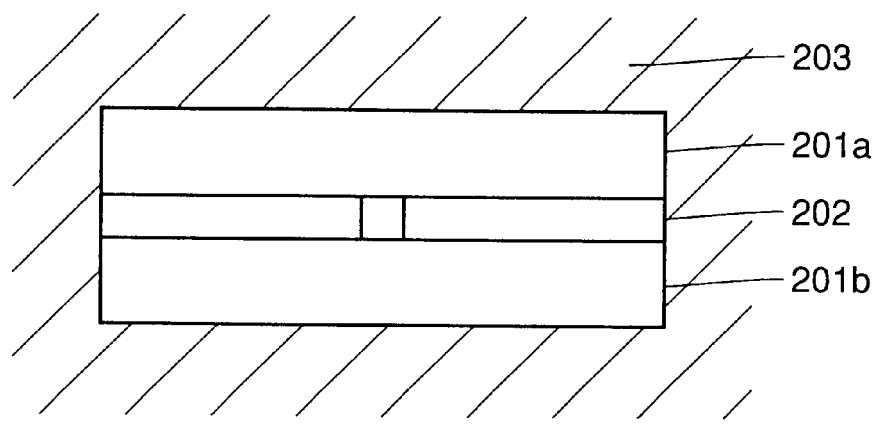
FIG. 10 schematically illustrates an apparatus used for measuring dielectric strength of liquefied air.

Liquefied air or a mixture of liquid nitrogen and liquid oxygen exhibits a dielectric strength approximately equivalent to that of the liquid nitrogen. Therefore, those are appropriate as a refrigerant for a superconducting cable and the like. As shown in FIG. 10, a polyimide resin 202 having a hole with a diameter of 1 mm and a thickness of 12.5 $\mu$m was interposed between two copper plates 201a and 201b and immersed in liquefied air 203, and then a voltage of 1 kV was applied between the two copper plates for one minute. As a result, no dielectric breakdown occurred. Under a electric field strength of 80 kV/mm, no dielectric breakdown occurred. This shows the liquefied air is equivalent to the liquid nitrogen (to 100 kV/mm) as to the dielectric strength.

Figure 11:
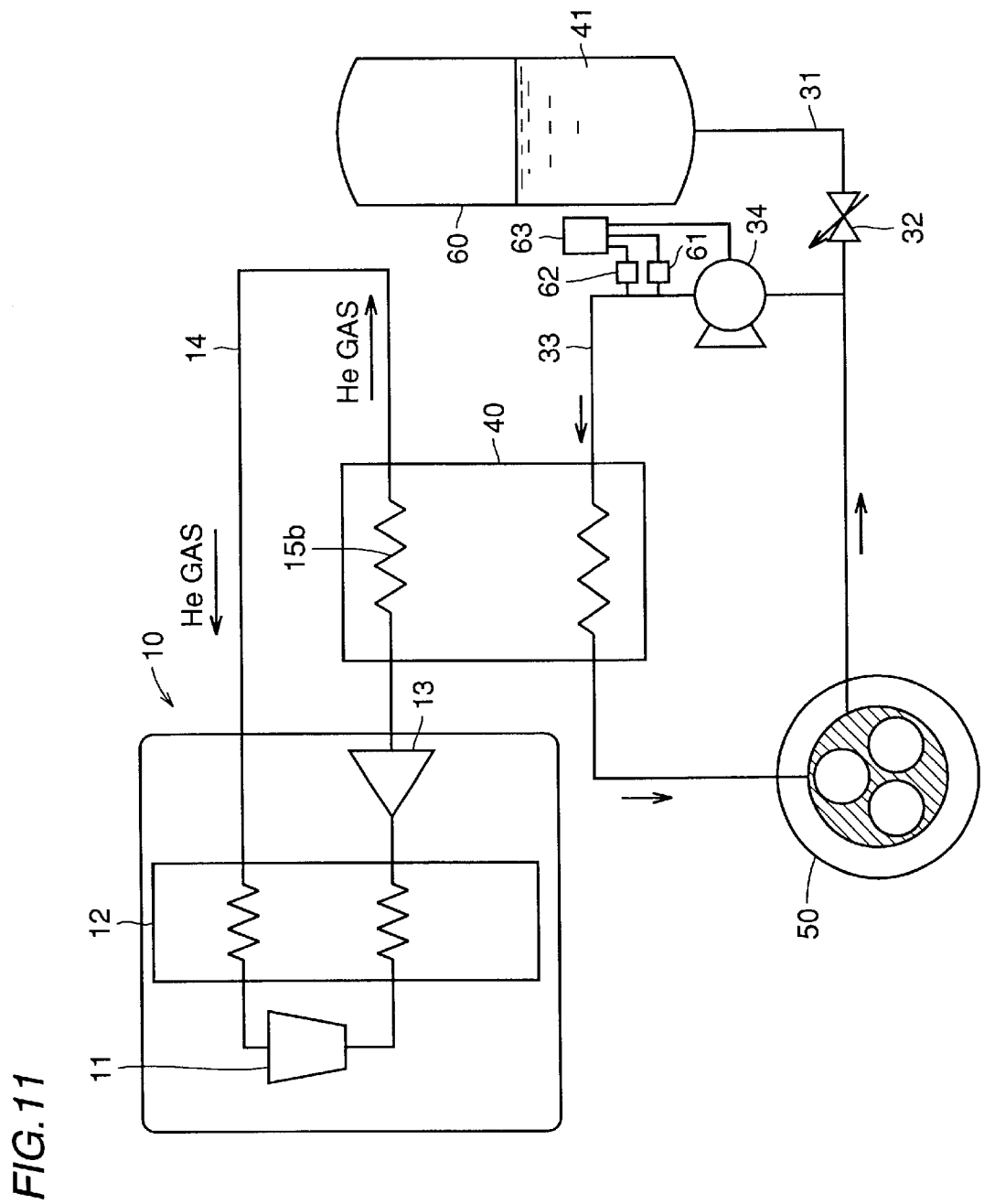
FIG. 11 schematically illustrates an embodiment of the cooling system according to the present invention.

FIG. 11 illustrates a cooling system for a high temperature superconducting cable according to the present invention. A refrigerator 10 includes a compressor 11 conducting adiabatic compression, a counterflow heat exchanger 12, an expander 13 conducting adiabatic expansion, and a piping system 14. Refrigerator 10 uses Brayton cycle as a refrigerating cycle. Helium gas is used in the refrigerating cycle, the helium gas being circulated by piping system 14 in the refrigerating cycle. The portion of piping system 14 through which the helium gas expanded by expander 13 passes constitutes a cryogenic portion 15 for cooling an object.

A tank 60 placed at the cooling system stores a refrigerant 41. The refrigerant can be introduced into tank 60 via an inlet. A piping system (not shown) may be placed at a suitable location of tank 60 in order to inject an additive for lowering the freezing point of the refrigerant. Further, a piping system for modulating the composition of the refrigerant may be connected to tank 60. In order to uniform the refrigerant within the tank, a stirring unit may be placed at tank 60.

A piping 31 for discharging the refrigerant to the outside is connected to tank 60. A valve 32 is placed at piping 31. Piping 31 is connected to a piping system 33 for directing the refrigerant to a high temperature superconducting cable 50 and circulating the refrigerant via high temperature superconducting cable 50. A pressure pump 34 is placed at piping system 33. The refrigerant is supplied via valve 32 from tank 60 to high temperature superconducting cable 50 by pump 34. After cable 50 is filled with the refrigerant, valve 32 is closed to block the path between tank 60 and piping system 33. The refrigerant can be circulated by pump 34 in piping system 33. A heat exchanger 40 is placed at piping system 33. In heat exchanger 40, the flow of the refrigerant and the flow of the expanded helium of the refrigerator are opposite to each other. The refrigerant supplied to cable 50 is cooled by the helium flowing through a cryogenic part 15b. The cooled liquefied air is sent to cable 50 to cool a high-Tc superconductor in the cable to or below its critical temperature. The cooled refrigerant is forced to circulate in piping system 33 via cable 50. A viscometer 61 for measuring the viscosity of the refrigerant as well as a flowmeter 62 for measuring the flow rate of the refrigerant are attached to piping system 33. Based on the measured viscosity and flow rate, the output of pump 34 is controlled by a controller 63. Differential pressure type viscometer and flowmeter can be used respectively as viscometer 61 and flowmeter 62. An electromagnetic controller of signal feedback type can be used as controller 63. By this system, cooling to 45 K is possible while allowing liquid nitrogen to flow.

Figure 12:
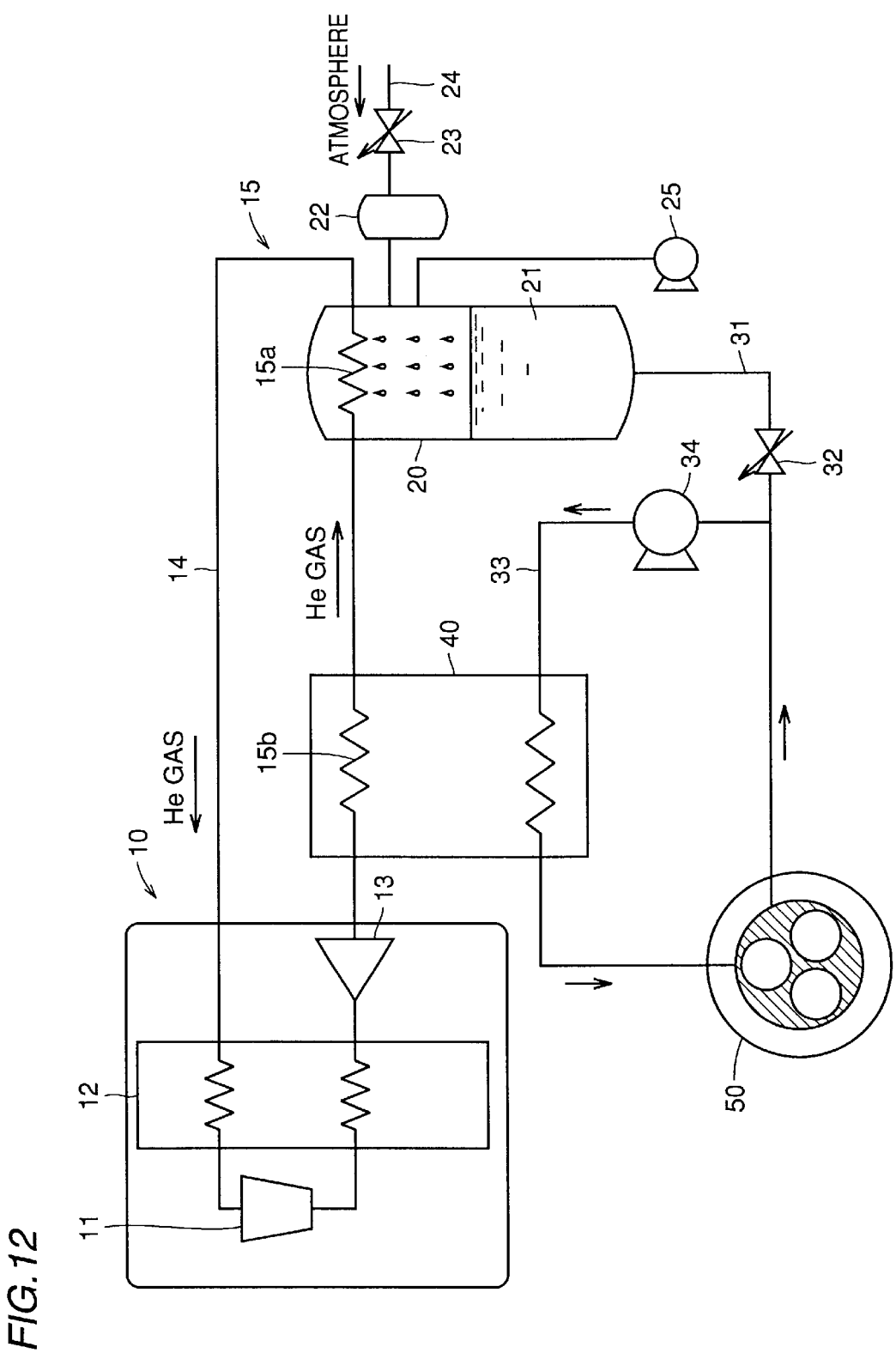
FIG. 12 schematically illustrates another embodiment of the cooling system according to the present invention.

FIG. 12 illustrates a cooling system which employs liquefied air. A refrigerator 10 includes a compressor 11, a counterflow heat exchanger 12, an expander 13 and a piping system 14. Refrigerator 10 uses Brayton cycle as a refrigerating cycle. Helium gas is used in the refrigerating cycle, the helium gas being circulated by piping system 14 in the refrigerating cycle. The portion of piping system 14 through which the helium gas expanded by expander 13 passes constitutes a cryogenic portion 15 for cooling an object.

A liquefied air storage tank 20 placed at the cooling system houses therein a part 15a of cryogenic portion 15. A heat exchanging fin or the like can be attached to part 15a. A piping system 24 for introducing air from the atmosphere is connected to tank 20 and an air introduction valve 23 and an air purifying unit 22 are placed at piping system 24. Air purifying unit 22 can remove any component, except for oxygen and nitrogen, contained in the atmosphere, which solidifies at a temperature higher than the liquefying temperature of the air. Such a component is, for example, water, carbon dioxide, or the like. In order to effect air purification, separation by membrane, condensation in a can, absorption to an adsorbent, or the like can be utilized. An exhaust pump 25 is further connected to tank 20. The air purified via piping system 24 is cooled by cryogenic part 15a in tank 20 and accordingly condensed. Tank 20 with cryogenic part 15a serves as a condenser. Liquefied air 21 resulting from condensation is stored in tank 20. In the liquefying step, water, carbon dioxide and the like which remain in the purified air may solidify and attach to cryogenic part 15a. If such materials accumulate on the surface of cryogenic part 15a, heat conduction would be deteriorated and the liquefied air cannot be obtained efficiently. Then, heating means such as a heater or the like is preferably attached to cryogenic part 15a. After liquefaction is stopped and tank 20 is emptied, cryogenic part 15a may be heated by the heating means such as a heater or the like to sublime the solid which adheres thereto. The resulting sublimate can be discharged from tank 20 by pump 25. A piping system (not shown) may be placed at an appropriate location of tank 20 in order to inject an additive for lowering the freezing point of the liquefied air. Further, a piping system for introducing liquid oxygen can be connected to tank 20 in order to modulate the composition of the liquefied air. A stirring unit may further be placed at tank 20 in order to uniformly mix various materials added to the liquefied air.

A piping 31 is connected to liquefied air storage tank 20 for discharging the liquefied air to the outside. A valve 32 is placed at piping 31. Piping 31 is connected to a piping system 33 for directing the liquefied air to a high temperature superconducting cable 50 and circulating the liquefied air via high temperature superconducting cable 50. A pressure pump 34 is placed at piping system 33. The liquefied air is supplied from tank 20 to high temperature superconducting cable 50 via valve 32. After cable 50 is filled with the liquefied air, valve 32 is closed so that the path between tank 20 and piping system 33 can be blocked. The liquefied air can be circulated by pump 34 in piping system 33. A heat exchanger 40 is placed at piping system 33. The flow of the liquefied air and the flow of the expanded helium of the refrigerator are opposite to each other in heat exchanger 40. The liquefied air supplied to cable 50 is cooled in heat exchanger 40 by the helium flowing through a cryogenic part 15b. The cooled liquefied air is sent to cable 50 to cool a high-Tc superconductor in the cable to or below its critical temperature. The cooled liquefied air is circulated in piping system 33 via cable 50. In the cooling system as shown, cryogenic portion 15 of refrigerator 10 is used for condensing the air and cooling the liquefied air. In the refrigerating cycle of refrigerator 10, the helium gas departing from the expander is first used for cooling the liquefied air and then for condensing the air.

Figure 13:
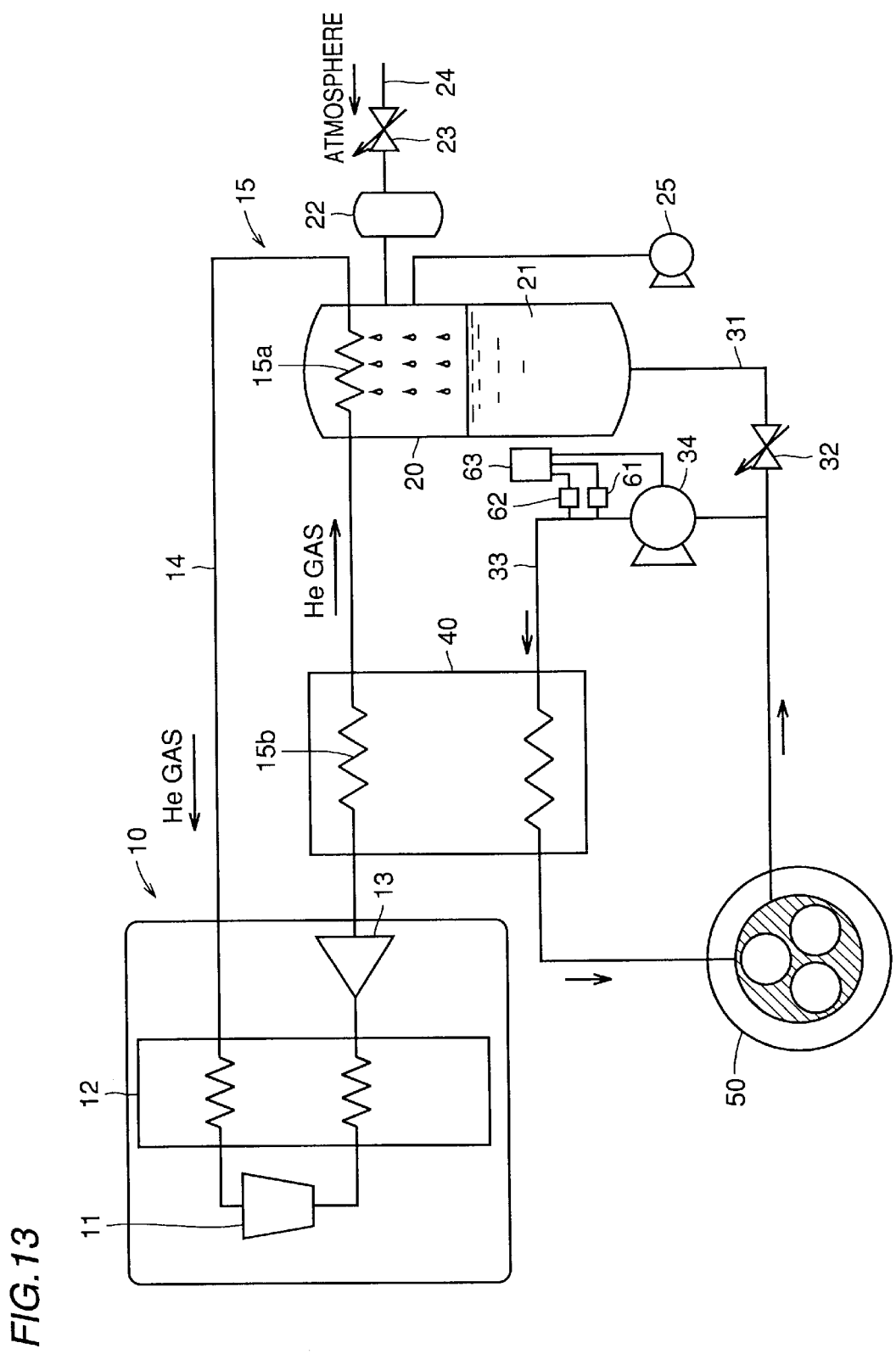
FIG. 13 schematically illustrates a further embodiment of the cooling system according to the present invention.

In the cooling system shown in FIG. 13, a viscometer 61 for measuring the viscosity of the refrigerant as well as a flowmeter 62 for measuring the flow rate of the refrigerant are attached to a piping system 33 in addition to those components of the system as shown in FIG. 12. Based on the measured viscosity and flow rate, a controller 63 controls output of a pump 34. Differential pressure type viscometer and flowmeter can be used respectively as viscometer 61 and flowmeter 62. An electromagnetic controller of signal feedback type can be used as the controller.

Figure 14A:
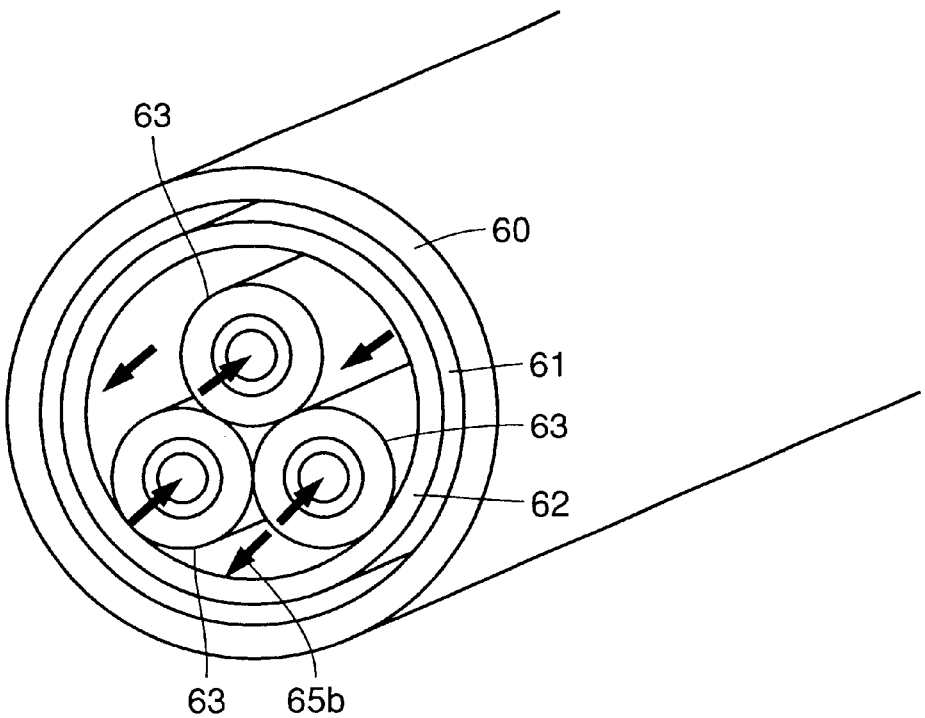
FIG. 14A illustrates one example of a structure of a superconducting cable.
Figure 14B:
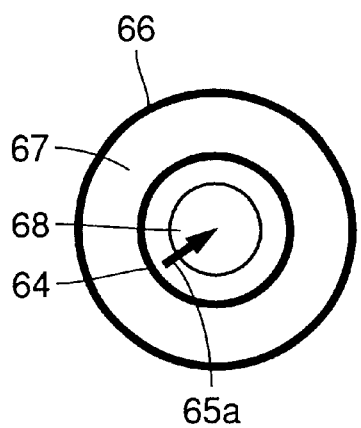
FIG. 14B is a schematic cross sectional view showing one of the conductors included in the cable in FIG. 14A.

FIGS. 14A and 14B illustrate an example of a structure of a superconducting cable. The cable is covered with an outer thermal insulation layer pipe 60, and via a stacked thermal insulation layer 61, an inner thermal insulation layer pipe 62 houses three-phase subcables 63. Subcable 63 includes a former 68, a high temperature superconductor 64, an electrical insulation layer 67, and a shield layer (magnetic shield) 66. A refrigerant 65a transported from any piping system 33 as shown in FIGS. 11 to 13 is sent into each subcable 63. Accordingly, high temperature superconductor 64 extending in the longitudinal direction is cooled and a refrigerant 65b returning through the outside of subcables 63 returns to the original cooling system. The refrigerant is cooled again by heat exchanger 40 shown in FIGS. 11 to 13, and then sent into three-phase subcables 63. The circulated refrigerant absorbs heat generated by AC loss.

Figure 15:
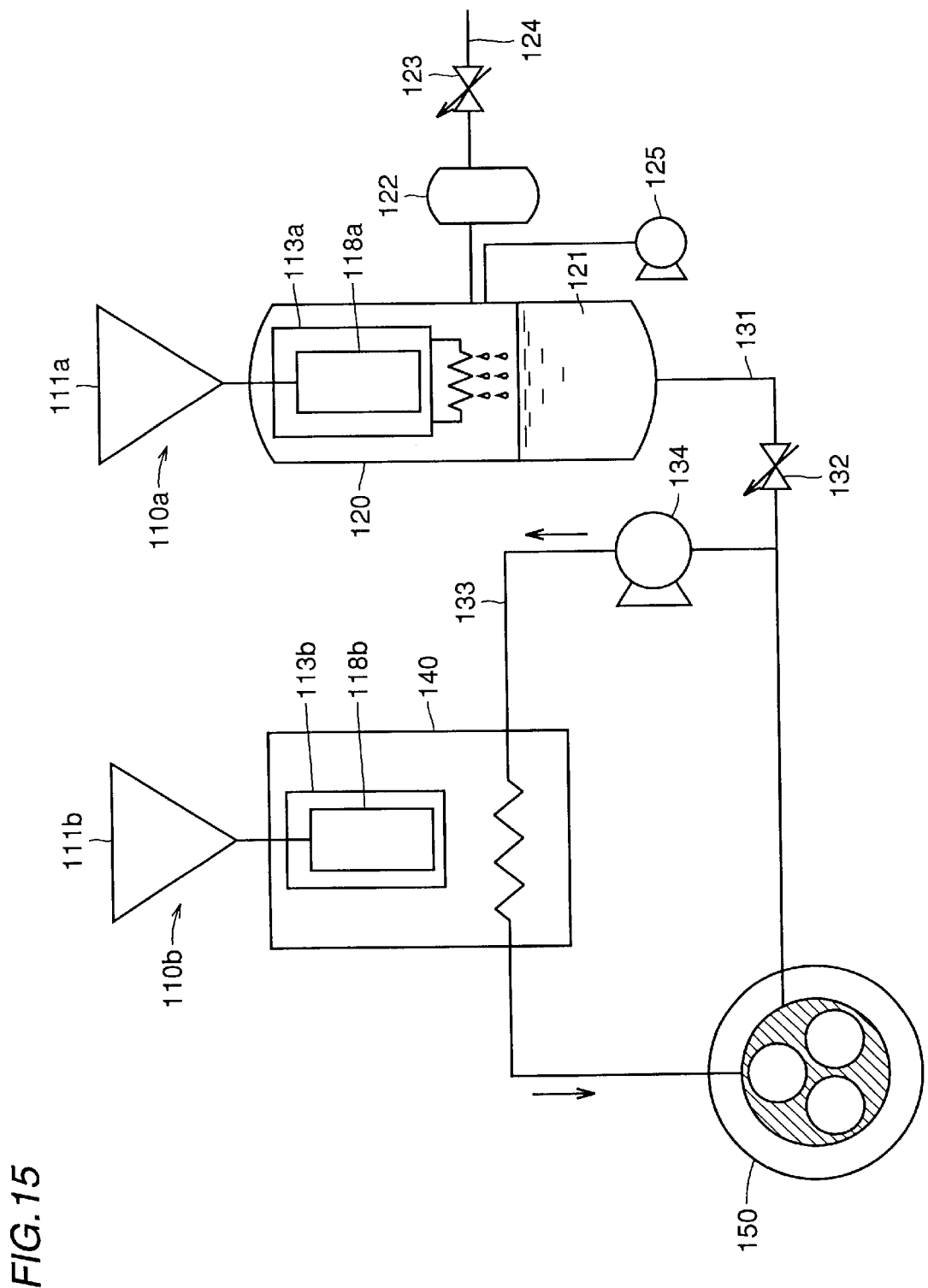
FIG. 15 schematically illustrates a further embodiment of the cooling system according to the present invention.

FIG. 15 illustrates another cooling system for a high temperature superconducting cable. The cooling system includes two refrigerators 110a and 110b. A cooling storage type refrigerator of Stirling type, Solvay type, GM type and the like can be used as those refrigerators. These refrigerators also use a refrigerating cycle in which compression and expansion are performed. Refrigerator 110a includes a compressor 111a and an expander 113 a having a piston 118a. Refrigerator 10b similarly includes a compressor 111b and an expander 113b having a piston 118b. A cooling head of refrigerator 110b is placed at a heat exchanger 140 for cooling liquefied air supplied to a high temperature superconducting cable 150. A cooling head of refrigerator 110a is placed in a liquefied air storage tank 120 for condensing the air. A heat exchanging fin or the like can be attached to the cooling head of refrigerator 110a in order to constitute an air condensing portion. A piping system 124 having a valve 123 and an air purifying unit 122 is connected to tank 120 as in the apparatus shown in FIG. 12. An exhausting pump 125 is connected to tank 120. The heater as described above can be placed at the air condensing portion in tank 120. The heater is used for removing any solidified matter accumulating at the air condensing portion. The air cooled to be condensed by the cooling head of refrigerator 110a is stored in tank 120.

Liquefied air 121 is directed to a cooling system of the superconductor via a piping 131 having a valve 132. The liquefied air is circulated in a piping system 133 via a pressure pump 134. Heat exchanger 140 is connected to piping system 133 so that the liquefied air passing through piping system 133 is cooled by heat exchange with the cooling head of refrigerator 110b. The cooled liquefied air is directed to high temperature superconducting cable 150.

Figure 16:
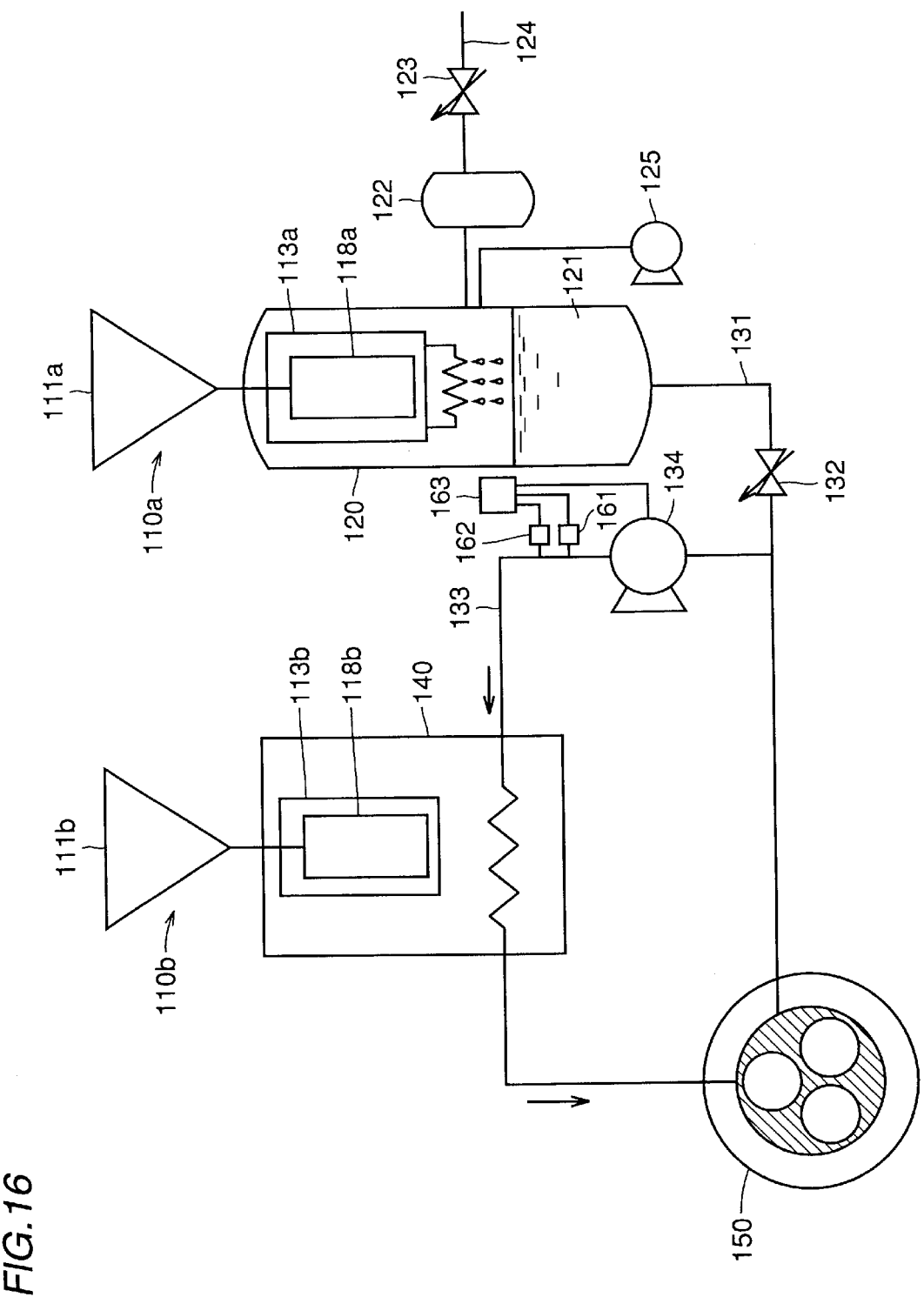
FIG. 16 schematically illustrates a further embodiment of the cooling system according to the present invention.

In a cooling system shown in FIG. 16, a viscometer 161 for measuring the viscosity of refrigerant as well as a flowmeter 162 for measuring the flow rate of refrigerant are attached to a piping system 133 in addition to those components of the system shown in FIG. 15. Based on the measured viscosity and flow rate, a controller 163 controls output of a pump 134. Differential pressure type viscometer and flowmeter can be used respectively as viscometer 161 and flowmeter 162, and an electromagnetic controller of signal feedback type can be used as controller 163.

A commercially available refrigerator can be used in the cooling systems shown in FIGS. 15 and 16, so that the cost of equipment and installation can be reduced and the maintenance of the equipment becomes easy. If a refrigerator such as a Stirling type refrigerator which is suitable for large-scale cooling is employed, a large-scale superconductor can be cooled in the systems shown in FIGS. 15 and 16. The superconducting cable having the structure illustrated in FIG. 14 can also be cooled in the cooling systems shown in FIGS. 15 and 16.

Figure 17:
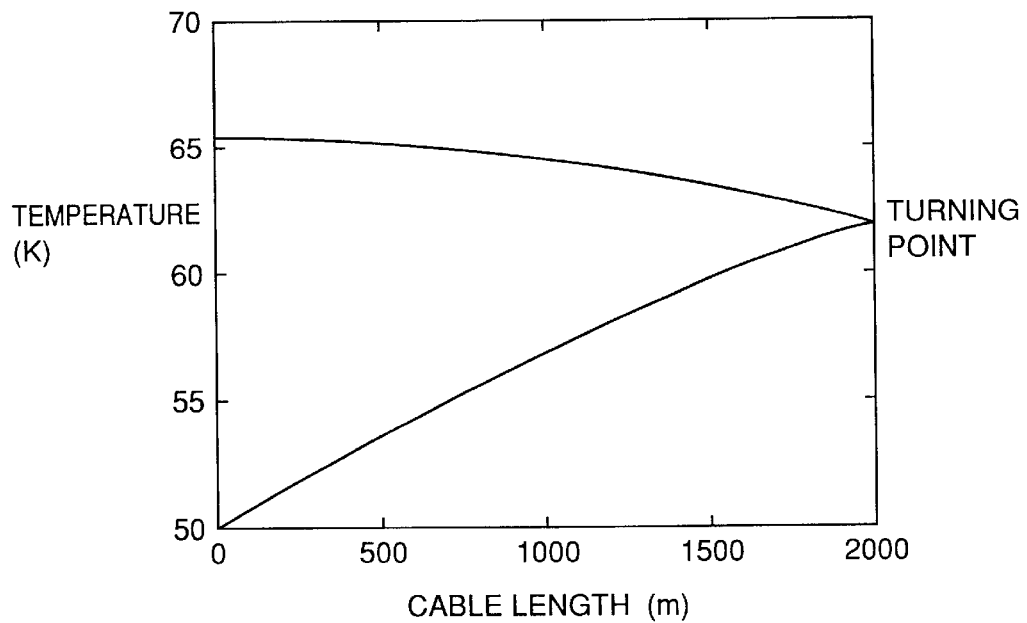
FIG. 17 illustrates a result of simulation in which a superconducting cable with a length of 2 km is cooled according to the present invention.

FIG. 17 illustrates a result of simulation in which a superconducting cable system of 2 km long is cooled by liquid nitrogen. In this system, the liquid nitrogen cools a cable while plying across a tubular passage of 2 km. This result shows that if the temperature at the entrance is 50 K, the temperature at the turning point located 2 km apart is 62 K and the temperature at the exit is 66 K. In other words, the temperature of nitrogen increases from 50 K to 66 K due to heat invasion. Although the current-carrying capacity is limited depending on the temperature at the exit, a Jc at 66 K can be expected to be about twice as high as that at 77 K. Specifically, a superconducting wire having a Jc of 15,000 $A/cm^2$ at 77 K may have a Jc of 30,000 $A/cm^2$ at 66 K. Thus, a practical and compact cable can be assembled even if a conventional superconducting wire having a relatively low Jc is employed.

Figure 18:
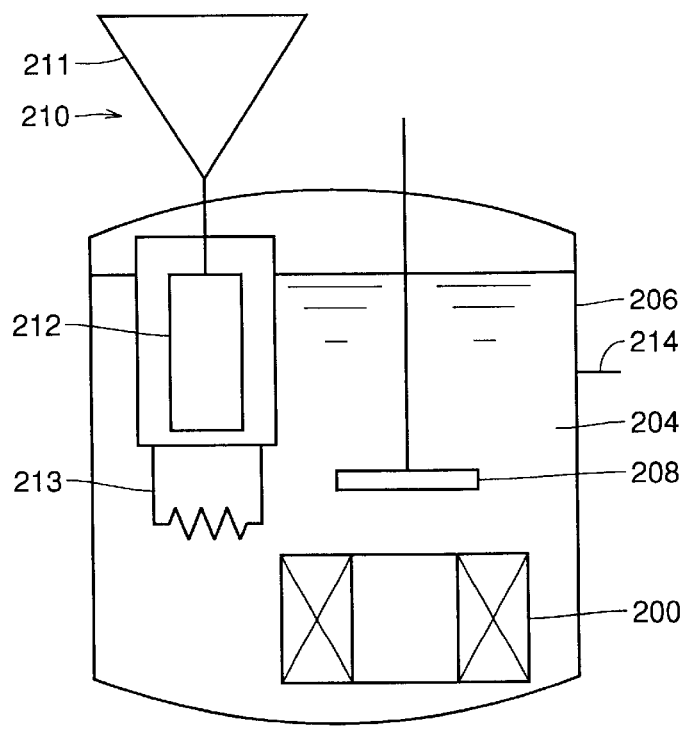
FIG. 18 schematically illustrates an embodiment of the system for cooling a superconducting magnet according to the present invention.

FIG. 18 illustrates a embodiment of a superconducting magnet system which is cooled according to the present invention. A superconducting magnet 200 is housed in a thermally insulated tank 206 and immersed in refrigerant 204. Refrigerant 204 is liquid nitrogen, for example. A refrigerator 210 having a compressor 211 for adiabatic compression, a piston 212 for adiabatic expansion, and a heat exchanger 213 is attached to tank 206. Refrigerant 204 is introduced from a refrigerant injection inlet 214 of tank 206 and cooled by heat exchanger 213 of refrigerator 210. A screw 208 is further placed in tank 206 for stirring refrigerant 204. Refrigerant 204 is forced to flow by screw 208. Fluid state of refrigerant 204 can be maintained by stirring it by screw 208 even if the temperature of refrigerant 204 is lowered to or below its original freezing point or triple point. As discussed above, measurement of the load applied to screw 208 enables evaluation of the viscosity of the refrigerant so as to know the state of the refrigerant. If the viscosity is high, the stirring speed can be raised so as to prevent the refrigerant from solidifying. Output of refrigerator 210 may also be controlled as necessary. Superconducting magnet 200 can thus be operated at a lower temperature, so that higher current can be made to flow through a coil constituting the magnet to produce a higher magnetic field.

Figure 19:
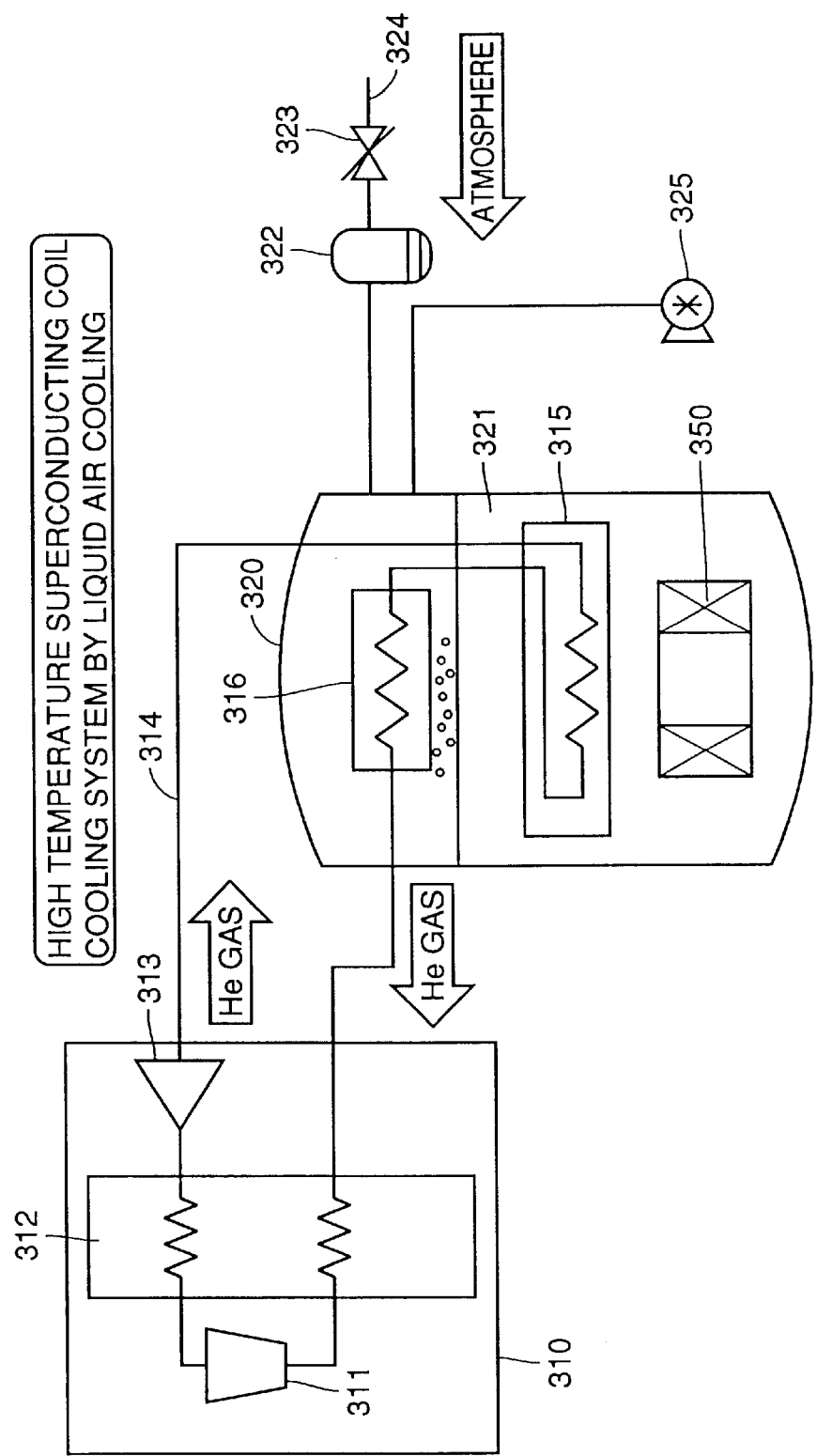
FIG. 19 schematically illustrates an embodiment of the system for cooling a high temperature superconducting coil according to the present invention.

FIG. 19 illustrates another cooling system for a high temperature superconducting magnet according to the present invention. A refrigerator 310 includes a compressor 311, a counterflow heat exchanger 312, an expander 313 and a piping system 314. Refrigerator 310 employs Brayton cycle as a refrigerating cycle. Helium gas is used in the refrigerating cycle, and the helium gas is circulated by piping system 314 in the refrigerating cycle. The part of piping system 314 through which the helium gas expanded by expander 313 passes constitutes a liquid air cooling heat exchanger 315 for cooling a high temperature superconducting coil and a liquid air condenser 316.

A liquefied air storage tank 320 placed at the cooling system houses therein a high temperature superconducting coil 350, liquid air cooling heat exchanger 315 and liquid air condenser 316. A heat exchanging fin or the like can be attached to liquid air condenser 316. A piping system 324 is connected to tank 320 for introducing air from the atmosphere, and an air introduction valve 323 and an air purifying unit 322 are placed at piping system 324. Air purifying unit 322 can remove any component, except for oxygen and nitrogen, contained in the atmosphere, which solidifies at a temperature higher than the liquefying temperature of the air. Such a component is water, carbon dioxide, or the like. In order to effect air purification, separation by membrane, condensation in a can, adsorption to an adsorbent, or the like can be utilized. An exhausting pump 325 is connected to tank 320. The air purified via piping system 324 is cooled to be condensed by liquid air condenser 316 in tank 320. Liquefied air 321 obtained by the condensation is stored in tank 320. In the liquefying step, water, carbon dioxide and the like remaining in the purified air may solidify and adhere to liquid air condenser 316. If such a material accumulates on the surface of liquid air condenser 316, heat conduction is deteriorated so that the liquefied air cannot efficiently be obtained. Then, heating means such as a heater or the like is preferably attached to liquid air condenser 316. The solid which adheres to liquid air condenser 316 can be sublimed, after liquefaction is stopped, by emptying tank 320 and then heating liquid air condenser 316 by the heating means such as a heater or the like. The sublimate can be discharged by a pump 325 from tank 320. Further, a piping system (not shown) may be placed at an appropriate location of tank 320 so as to inject an additive for lowering the freezing point of the liquefied air. In order to modulate the composition of the liquefied air, a piping system can be connected to tank 320 for introducing liquid oxygen. Further, a stirring unit may be placed at tank 320 in order to uniformly mixing various materials added to the liquefied air.

After high temperature superconducting coil 350 is immersed in the liquefied air, the liquid air cooled by heat exchanger 315 moves downward to cool high temperature superconducting coil 350. The liquid air absorbing the heat from coil 350 then moves upward. The liquid air moving upward is cooled by the heat exchanger and then move to cool coil 350 again. In this way, convection of the liquid air occurs between heat exchanger 315 and coil 350 to produce a circulation system of the liquid air. The air vaporized in tank 320 is condensed by heat exchanger 316 and then returned to cool coil 350 again. In the cooling system shown, cryogenic parts 316 and 315 of refrigerator 310 are used for condensing the air and cooling the liquefied air. In the refrigerating cycle of refrigerator 310, helium gas departing from the expander is first used for cooling the liquefied air and then for condensing the air.

Figure 20:
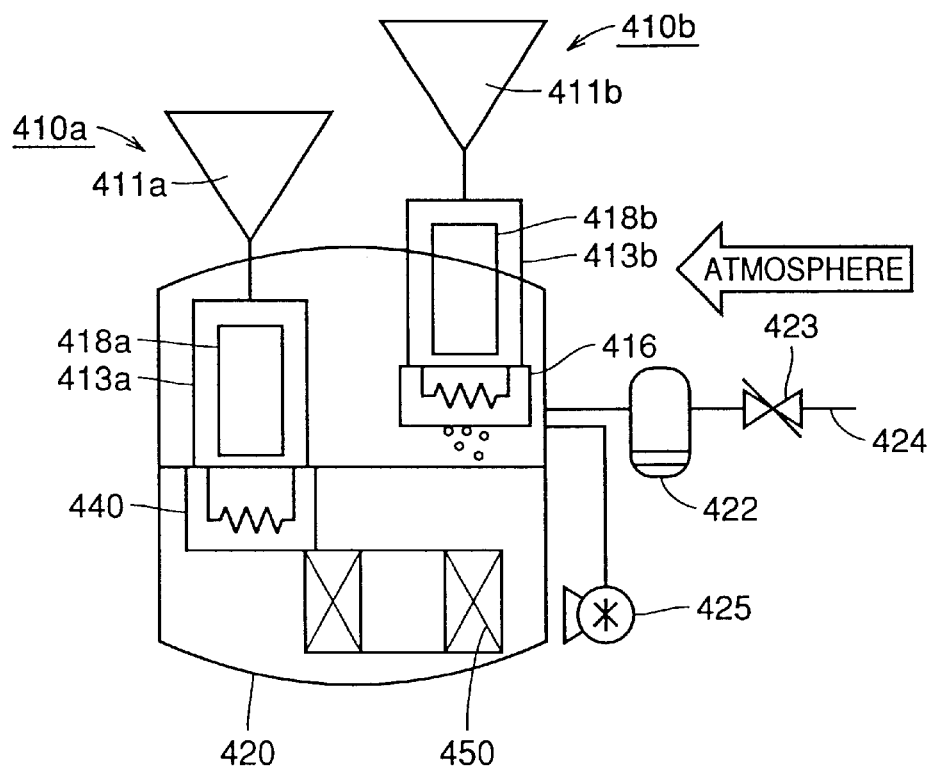
FIG. 20 schematically illustrates another embodiment of the system for cooling a high temperature superconducting coil according to the present invention.

FIG. 20 illustrates a further embodiment of a cooling system for a high temperature superconducting coil. The cooling system includes two refrigerators 410a and 410b. A cooling storage type refrigerator of Stirling type, Solvay type, GM type or the like can be used as those refrigerators. These refrigerators also use a refrigerating cycle in which compression and expansion are carried out. Refrigerator 410a includes a compressor 411a and an expander 413a having a piston 418a. Refrigerator 410b similarly includes a compressor 411b and an expander 413b having a piston 418b. A cooling head of refrigerator 410a is connected to a heat exchanger 440 placed above a high temperature superconducting coil 450. A cooling head of refrigerator 410b is simultaneously placed in a liquefied air storage tank 420 for a high temperature superconducting coil 450 in order to condense the air. A heat exchanging fin or the like can be attached to the cooling head of refrigerator 410b in order to constitute an air condensing portion. A piping system 424 having a valve 423 and an air purifying unit 422 is connected to tank 420 as in the apparatus shown in FIG. 19. Further, an exhausting pump 425 is connected to tank 420. A heater as described above can be placed at a liquid air condenser 416 in tank 420. The heater is used for eliminating any solidified matter accumulating at liquid air condenser 416. The air cooled to be condensed by the cooling head of refrigerator 410b is stored in tank 420. In order to cool high temperature superconducting coil 450 by the liquefied air, heat exchanger 440 is placed above the high temperature superconducting coil. In the liquid air contained in tank 420, circulation occurs due to convection. The air vaporized in tank 420 is condensed by condenser 416 and returns to a liquid phase. High temperature superconducting coil 450 is thus cooled in such a convection and vaporization-condensation cycle.

A commercially available refrigerator can be used in the cooling system shown in FIG. 20, so that the cost of equipment and installation can be reduced and maintenance of the equipment can be done easily. If any refrigerator such as the Stirling type refrigerator suitable for large-scale cooling is employed, a large-scale superconductor can be cooled in the system shown in FIG. 20.

Figure 21:
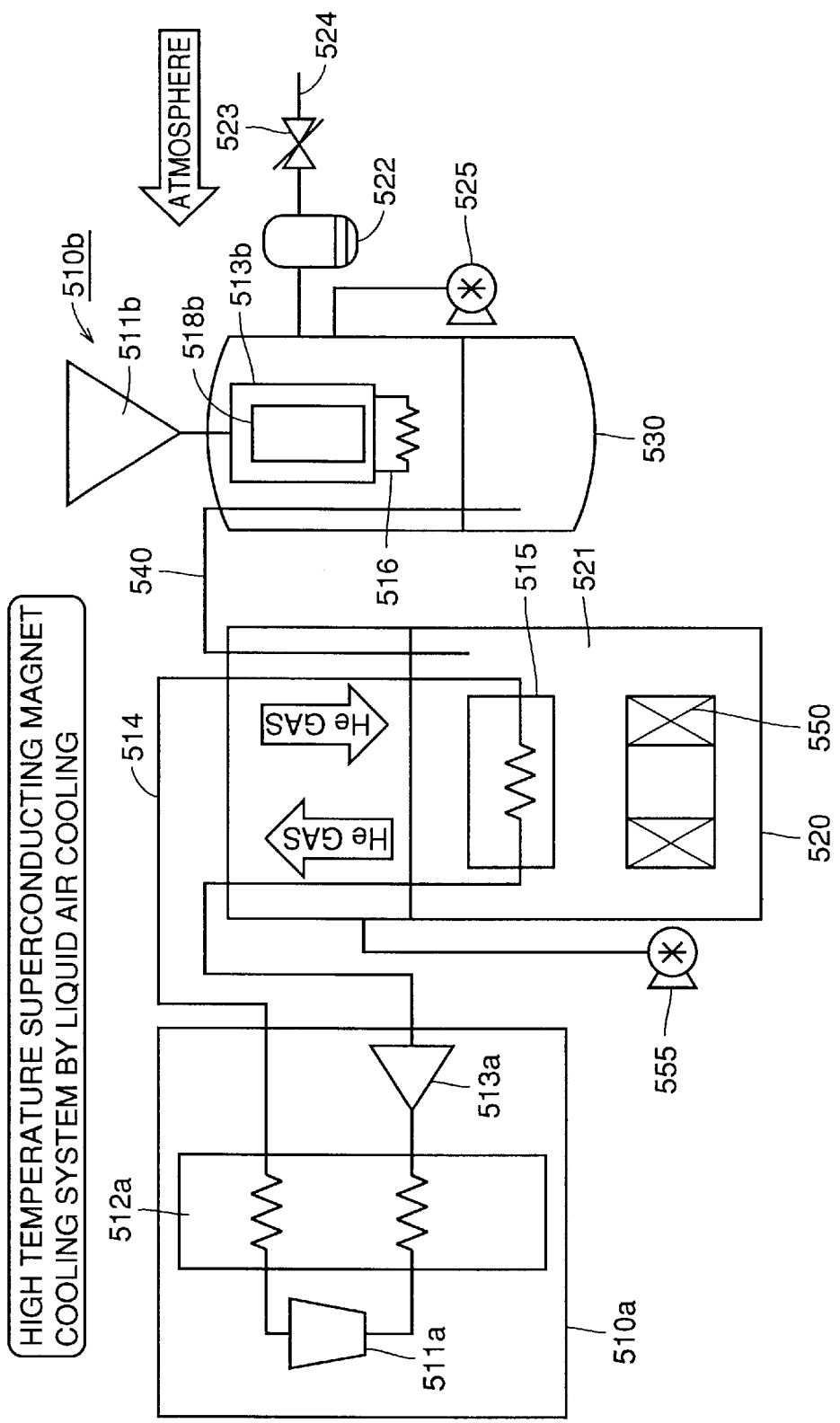
FIG. 21 schematically illustrates a further embodiment of the system for cooling a high temperature superconducting coil according to the present invention.

FIG. 21 illustrates a further cooling system for a high temperature superconducting magnet according to the present invention. The cooling system includes two refrigerators 510a and 510b. Refrigerator 510a includes a compressor 511a, a counterflow heat exchanger 512a, an expander 513a and a piping system 514. Refrigerator 510a employs Brayton cycle as a refrigerating cycle as in FIG. 19. Helium gas is used in the refrigerating cycle and circulated in the refrigerating cycle by piping system 514. The portion of piping system 514 through which helium gas expanded by expander 513a passes is formed of a liquid air cooling heat exchanger 515 which is placed above a high temperature superconducting coil for cooling it. Refrigerator 510b can be implemented by a cooling storage type refrigerator such as Stirling type, Solvay type, GM type or the like, and includes a compressor 511b and an expander 513b having a piston 518b. A cooling head of refrigerator 510b is placed in a liquefied air storage tank 530 to condense the air.

Liquefied air generation storage tank 530 houses therein the cooling head of refrigerator 510b and a liquid air condenser 516. A heat exchanging fin or the like can be provided at liquid air condenser 516. A piping system 540 is connected to tank 530 for transporting the internal liquid air to a tank 520. An air introduction valve 523 and an air purifying unit 522 are placed at a piping system 524. Air purifying unit 522 can remove any component, except for oxygen and nitrogen, contained in the atmosphere, which solidifies at a temperature higher than the liquefying temperature of the air. Such a component is water, carbon dioxide, or the like. In order to purify the air, separation by membrane, condensation in a can, adsorption to an adsorbent, and the like can be utilized. An exhausting pump 525 is further connected to tank 530. The air purified via piping system 524 is cooled to be condensed in tank 530 by liquid air condenser 516. The liquefied air 521 obtained by the condensation is stored in tank 530. In the liquefying step, water, carbon dioxide and the like which remain in the purified air may solidify and adhere to liquid air condenser 516. If these materials accumulate on the surface of liquid air condenser 516, heat conduction would deteriorate so that the liquefied air cannot be obtained efficiently. Then, heating means such as a heater or the like is preferably attached to liquid air condenser 516. The solid adhering to liquid air condenser 516 can be sublimated, after the liquefaction is stopped, by emptying tank 530 and heating liquid air condenser 516 by the heating means such as a heater or the like. The resulting sublimate can be discharged from tank 530 by pump 525. In order to inject an additive for lowering the freezing point of the liquefied air, a piping system (not shown) may be placed at an appropriate location of tank 530. Further, in order to modulate the composition of the liquefied air, a piping system can be connected to tank 530 for introducing liquid oxygen. In order to uniformly mix various materials added to the liquefied air, a stirring unit may be placed at tank 530. A vacuum exhausting pump 555 can further be placed at tank 520 for transporting the liquid air from tank 530 into tank 520.

Tank 520 accommodates a high temperature superconducting coil 550 and a liquid air cooling heat exchanger 515a located above the coil. The liquefied air in tank 530 is transported to tank 520 via piping system 540 by vacuum pump 555 which discharges air from tank 520. Coil 550 is cooled by the transported liquid air. After high temperature superconducting coil 550 is immersed in the liquefied air, the liquid air cooled by liquid air cooling heat exchanger 515a moves downward to cool high temperature superconducting coil 550. The liquid air absorbing heat form the coil moves upward. Under the circulation of the liquid air caused by such convection, the superconducting coil is cooled.

The cooling method and cooling apparatus according to the present invention are applicable to the cable, superconducting instruments and the like as described below, without being limited to any specific use.

Figure 22:
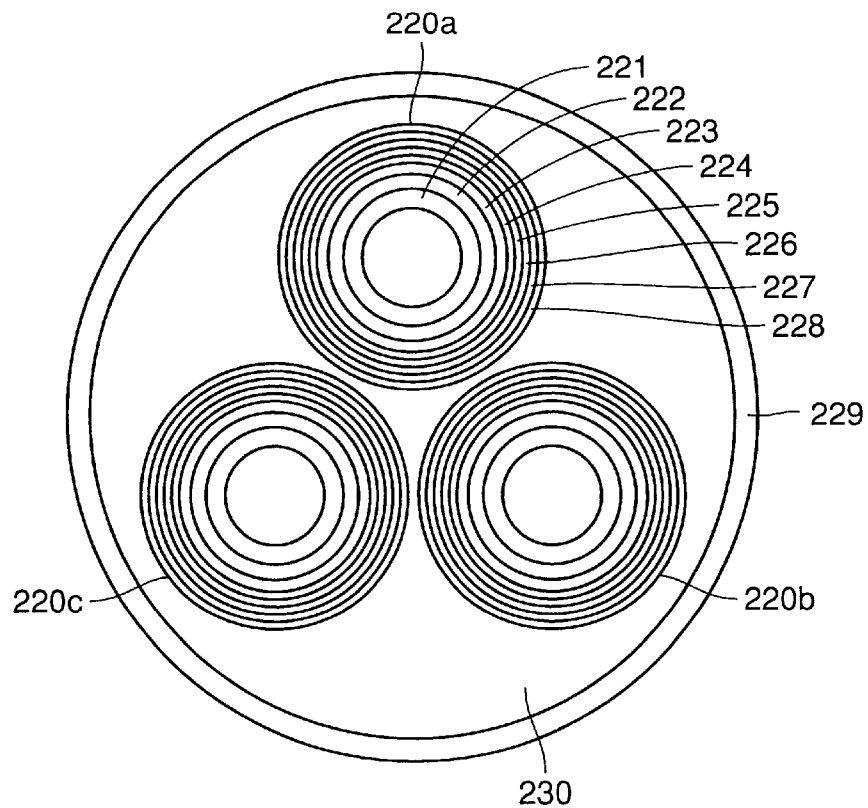
FIG. 22 is a cross sectional view schematically illustrating a superconducting three-phase cable which is cooled according to the present invention.

FIG. 22 illustrates another embodiment of a high temperature superconducting three-phase cable. Phases 220a to 220c housed in an outer protection pipe 229 each include a stainless steel former 221, an oxide superconducting tape 222, a stainless steel tube 223, a super insulation 224, a vacuum layer 225, a stainless steel tube 226, a PPLP insulator 227, and a stainless steel former 229 in this order. Super insulation 224 and vacuum layer 225 function for thermal insulation. PPLP insulator 227 is of room temperature type. The portion between phases 220a to 220c and outer protection pipe 229 is filled with gas or oil 230 for insulation. Phases 220a to 220c are each cooled by refrigerant in fluid state according to the present invention. The refrigerant is allowed to flow in stainless steel former 221 on the inside. The refrigerant circulates in the cable, one phase 220a being used for the go passage of the refrigerant, and two phases 220b and 220c being used for the return passage of the refrigerant. Preferably, liquid nitrogen or a mixture of liquid nitrogen and liquid oxygen including liquid air is used as the refrigerant. Supercooling in the forced fluid state as described above causes the refrigerant to be cooled to a cryogenic temperature of about 40 K. For example, a superconducting cable is cooled by any of the systems shown in FIGS. 11 to 13, 15 and 16. At the temperature of about 40 K, critical current which is approximately five times as great as that at liquid nitrogen temperature can be achieved. Cooling at such a cryogenic temperature enables the cable to be more compact. According to the present invention, the refrigerant in the supercooled state can prevent generation of bubbles and have higher dielectric strength.

Figure 23:
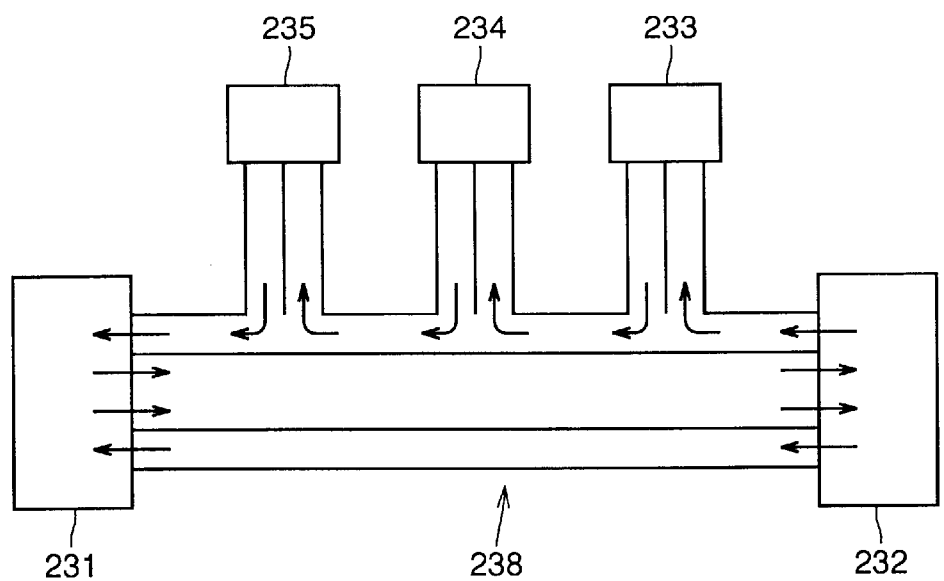
FIG. 23 schematically illustrates a cable cooling system according to the present invention.

In a preferred manner according to the present invention, refrigerant in an elongated cable is cooled by a plurality of refrigerators or refrigerating systems 231 to 235 as shown in FIG. 23. Refrigerant which is cooled to an initial temperature (e.g. minimum temperature) by refrigerator 231 is introduced into a cable 238. The refrigerant is also cooled by refrigerator 232 when it departs from cable 238. The refrigerant is preferably cooled at intervening points along cable 238 by refrigerators 233, 234 and 235. Cooling may be effected at a plurality of intervening points as shown in the drawing, or may be cooled at one intervening point. The number of the intervening points and the interval therebetween as well as the cooling capacity of the refrigerator are determined according to the specification of the cable. The refrigerant circulates in cable 238. The refrigerant is cooled at the intervening points on the go passage and/or return passage of the refrigerant. In particular, the refrigerant on the return passage having temperature increased is preferably cooled at any intervening point.

Figure 24:
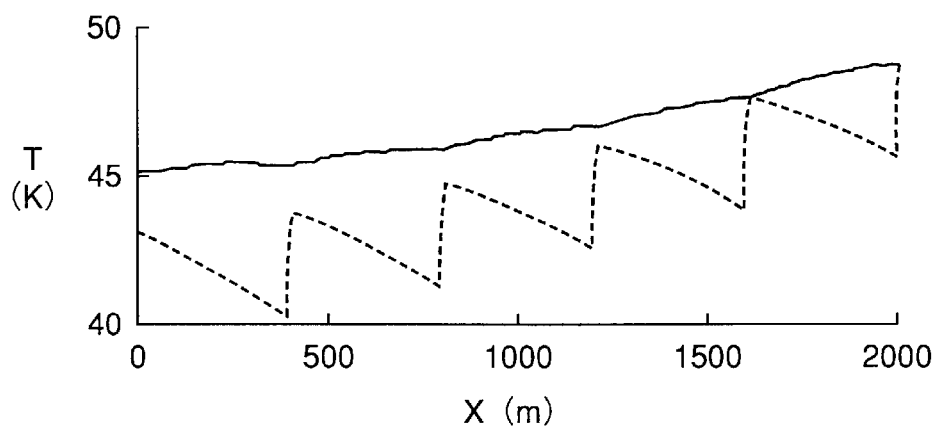
FIG. 24 illustrates a result of simulation in which a superconducting three-phase cable is cooled at the intervening points thereof according to the present invention.
Figure 25:
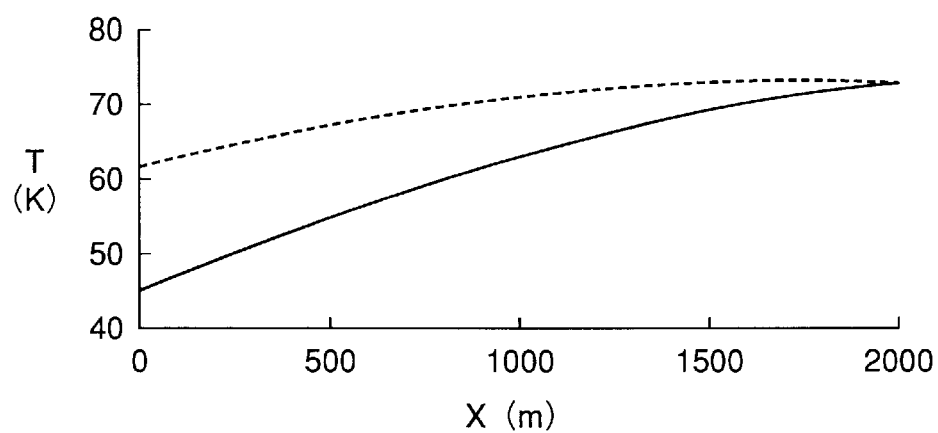
FIG. 25 illustrates a result of simulation in which no intervening point is cooled, in contrast with the result shown in FIG. 24.

As discussed below, a simulation was made for a cable of 2,000 m long which was to be cooled by circulated refrigerant according to the go and return system. It was supposed that a system was provided for cooling refrigerant on the return passage by five refrigerators placed at intervals of 400 m. In the calculation model, a three-phase cable structure was employed and a flow rate of liquid nitrogen of 10 litter/min, a heat conduction of a PPLP thermal insulation part of 0.025 W/m·K, an AC loss of 1.8 W/m, a dielectric loss of 0.08 W/m and a heat invasion loss of 0.94 W/m were used. Based on these values, the temperature distribution in the longitudinal direction of the cable was determined by a numerical calculation according to the differential method of an ordinary differential equation of heat conduction. The result is shown in FIG. 24. In FIG. 24, the axis of ordinate denotes temperature (T), and the axis of abscissa denotes position (X) along the cable. The solid line shows the temperature distribution of refrigerant on the go passage, and the dotted line shows the temperature distribution of refrigerant on the return passage. If the temperature of the refrigerant at the entrance was 45 K, the temperature at the exit may be set at 43 K and the temperature at the turning point may be set at 48 K. Accordingly, the temperature of the entire refrigerant may be set below 50 K. On the other hand, simulation was made similarly for the case in which the refrigerant on the return passage was not cooled, and accordingly the temperature distribution as shown in FIG. 25 was obtained. Calculation proved that if the temperature at the entrance was 45 K, the temperature at the exit was 62 K and that at the turning point was 72 K. As described above, at 50 K, a Jc which is approximately three times as high as that at 77 K can be achieved and thus such a cooling system contributes to achievement of a compact cable and a practical cable.

Figure 26:
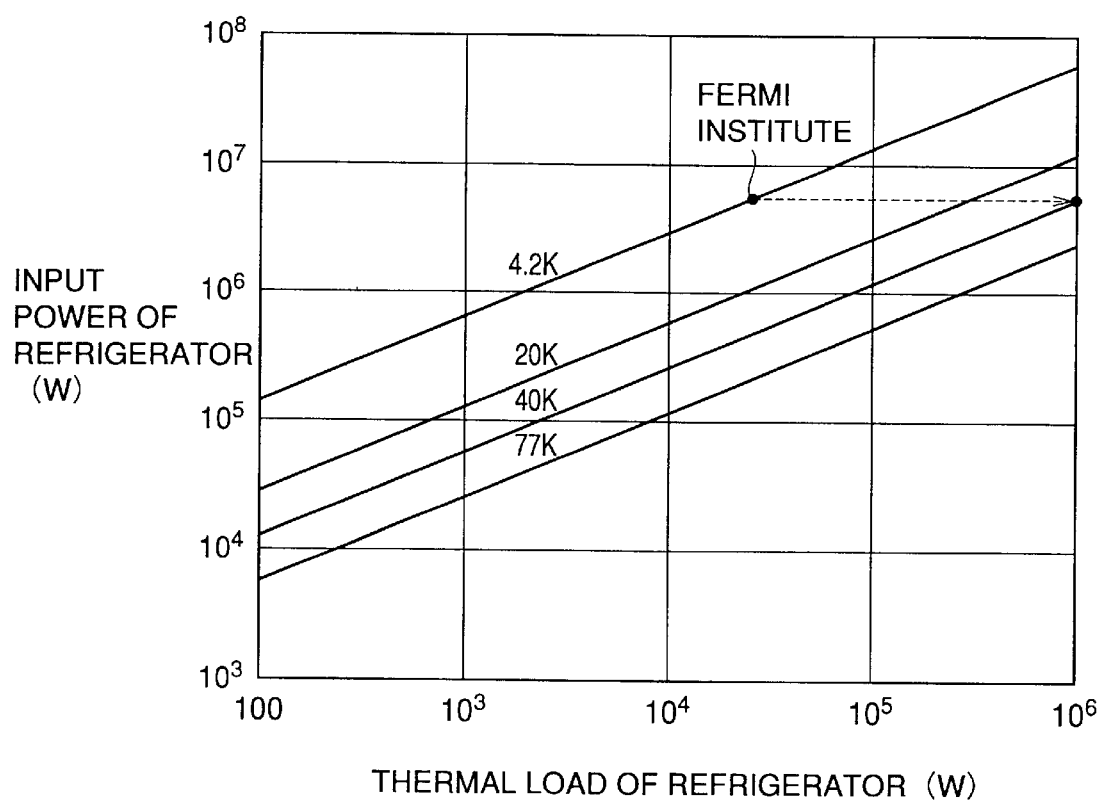
FIG. 26 illustrates a result of trial calculation of power generation of a refrigerator for cooling invasive heat in a DC cable.

An enormous Joule loss is generated in a normal conducting DC power cable. For example, the total transmission loss of a DC cable of 400 kV, 1,600 A and 1,000 km long is said to reach 85 MW (85 W/m). On the other hand, a high temperature superconducting DC cable is considered to have little Joule loss in the superconductor, and invasive heat from the outside results in a principal energy loss. FIG. 26 shows a result of trial calculation of power generation of a refrigerator for cooling the invasive heat. In FIG. 26, the axis of ordinate indicates input power (W) of the refrigerator and the axis of abscissa indicates thermal load (W) of the refrigerator. As to the power for refrigeration load with liquid helium (4.2 K) and liquid nitrogen (77 K), those values as shown in FIG. 26 can be determined according to past records. Due to temperature dependency of COP (Coefficient of Performance) indicating efficiency of a general refrigerator, the values associated with 40 K can be determined as shown in FIG. 26 based on the values associated with liquid helium and liquid nitrogen by a proportional calculation. For example, a liquefier used for a magnet of an accelerator in Fermi Institute has a refrigeration capacity of 20 kW at 4.2 K. The power of a compressor for exhibiting this capacity can be determined as 7 MW from FIG. 26. On the other hand, if the same power is used to generate a refrigerant of 40 K, higher refrigeration efficiency can be obtained and a refrigeration capacity of approximately 1,000 kW can be expected. If a superconducting DC cable has an amount of heat invasion of 1 W/m, the refrigeration load is 1 MW for 1,000 km, so that the final load of the superconducting DC cable including the refrigerator can be estimated to be approximately 7 MW. This value is smaller than the value of 85 MW for the above-mentioned normal conducting cable by at least one order. Thus, if a high temperature superconducting cable is used at approximately 40 K, energy can be saved to a large extent.

FIGS. 27A to 27C illustrate an embodiment of the cooling system for a DC superconducting cable. DC conductors 270a and 270b housed in an outer case 279 each include a stainless steel former 271, an oxide superconducting tape 272, a stainless steel tube 273, a super insulation 274, a vacuum layer 275, a stainless steel tube 276, a PPLP insulator 277, and a stainless steel former 278 in this order. In outer case 279, two conductors 270a and 270b of go and return are housed and the outer case is filled with insulating oil or insulating gas 280 such as $N_2+SF_6$. Refrigerant flows in stainless steel former 271 on the inner side. The energizing method shown in FIG. 27A is of the generally employed midpoint or neutral grounding system of the two-wire system. Energizing is effected on the go and return between a first base 281b having a first system 281a and a second base 282b having a second system 282a. Supercooled liquid refrigerant is allowed to flow through a cable 270 according to the present invention. The refrigerant is circulated between go conductor 270a and return conductor 270b. Brayton cycle refrigerators 290a and 290b including respective expanders 291a and 291b, compressors 292a and 292b, and heat exchangers 293a and 293b are placed respectively at the first and second bases 281b and 282b. The liquid refrigerant which is supercooled by Brayton cycle refrigerator 290a via heat exchanger 294a is sent by a pressure pump 295a through go conductor 270a to the second base 282b. The refrigerant is similarly cooled at the second base 282b by Brayton cycle refrigerator 290b and fed by pressure by a pump 295b. The refrigerant passes through return conductor 270b to return to the first base 281b.

Figure 28A:
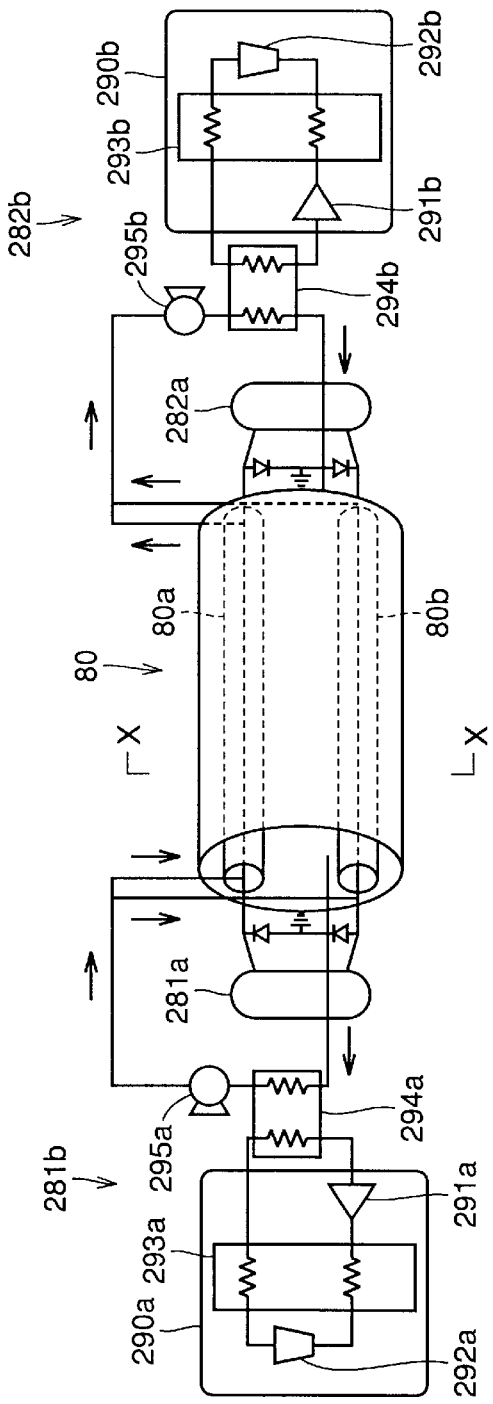
FIG. 28A schematically illustrates another embodiment of the cooling system for a DC cable according to the present invention.
Figure 28B:
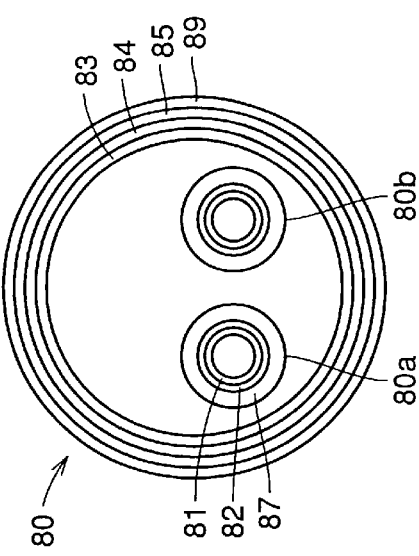
FIG. 28B is a schematic cross sectional view of a cable used in the system in FIG. 28A.
Figure 29A:
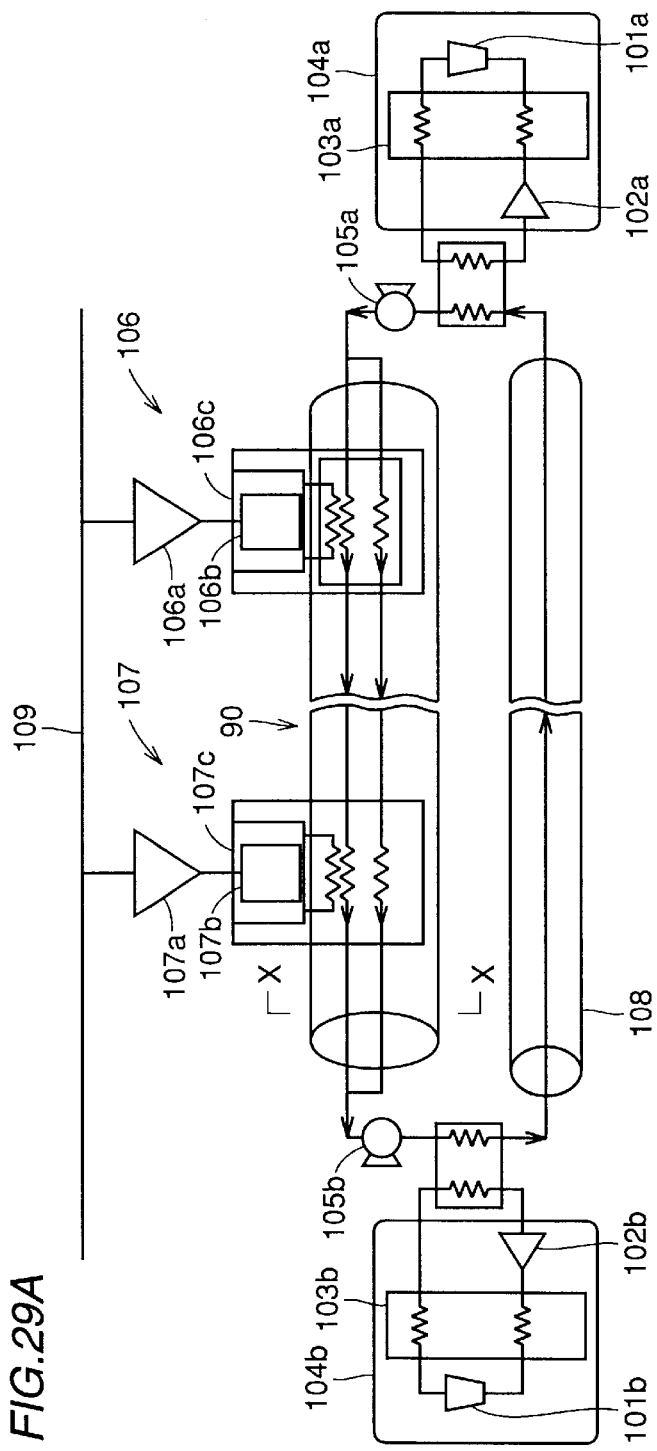
FIG. 29A schematically illustrates a further embodiment of the cooling system for a DC cable according to the present invention.
Figure 29B:
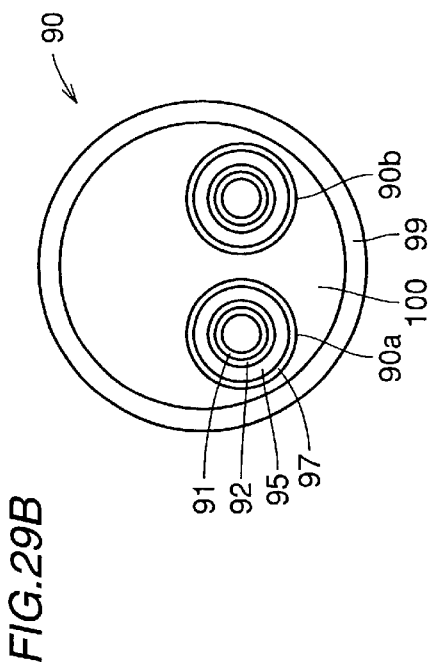
FIG. 29B is a schematic cross sectional view of a cable used in the system in FIG. 29A.

The system shown in FIGS. 28A and 28B employs a DC superconducting cable having a structure different from that in FIGS. 27A to 27C. Two conductors 80a and 80b of go and return are housed in an outer pipe 89. Each of conductors 80a and 80b includes a stainless steel former 81, an oxide superconducting tape 82 and a PPLP insulating layer 87 in this order. A vacuum layer 85, a super insulation 84 and a stainless steel former 83 are placed in outer pipe 89. Refrigerant on the go passage flows in stainless steel former 81 of each of conductors 80a and 80b, and refrigerant on the return passage flows between conductors 80a and 80b and outer stainless steel former 83. The PPLP is used as an electrical insulating material for conductors 80a and 80b and the refrigerant on the return passage serves as a thermal shield for the refrigerant on the go passage. Energizing is implemented on the go and return passages according to the midpoint or neutral grounding system of the two-wire system. The DC superconducting cable is cooled by the supercooled liquid refrigerant via the cooling system similar to that in FIG. 27A.

In the case of a remarkably long DC superconducting cable such as a submarine cable, refrigerant possibly needs to be cooled on the way through the cable. Considering the problem of conductance of evacuation, it would be practical that the cable is constructed by connecting relatively short cable units. In this case, it is preferable to cool invasive heat at the joints. FIGS. 29A and 29B and FIGS. 30A and 30B illustrate examples in which a refrigerator station is placed at a intermediate portion of a DC cable. Conductors 90a and 90b of a DC superconducting cable 90 shown in FIG. 29B each include a former 91, a high temperature superconducting layer 92, a vacuum thermal insulation layer 95 and a PPLP electrical insulation layer 97. Two conductors 90a and 90b of go and return respectively are housed in an outer case 99 and outer case 99 is filled with insulating oil or insulating gas 100 such as $N_2+SF_6$. Two conductors 90a and 90b each independently have a vacuum thermal insulation layer 95. Electrical insulation layer 97 of each conductor is exposed to room temperature. Such a structure may be common with that of the normal conducting cable. Therefore, a normal conductor of the normal conducting cable can be replaced with a superconductor to fabricate a cable easily. Refrigerant flows in two conductors 90a and 90b in the same direction. In the cooling system shown in FIG. 29A, liquid refrigerant which is supercooled by a Brayton cycle refrigerator 104a having a compressor 101a, an expander 102a and a heat exchanger 103a is sent by a pump 105a to DC superconducting cable 90. On the way along cable 90, a plurality of refrigerator stations 106 and 107 are provided and the refrigerant passing along cable 90 is cooled at each of stations 106 and 107. Cooling storage type refrigerators 106c and 107c respectively having compressors 106a and 107a and pistons 106a and 106b, for example, are provided respectively to stations 106 and 107. The size and position of the refrigerating stations are determined according to the specification of the cable. The refrigerant departing from cable 90 is cooled by a Brayton cycle refrigerator 104b having a compressor 101b, an expander 102b and a heat exchanger 103b. The refrigerant is returned by a pump 105b to the entrance of the cable via a passage 108. In such a cooling system, liquid refrigerant can be maintained in a supercooled state. Electric power may be supplied to the refrigerator stations from a separately provided cable 109 or from the cooled cable. A communication cable (optical fiber) for control can be arranged in parallel with the main cable for operational control of the refrigerators. The power supply for the refrigerators can also be used for power of a pump and power of a rotational viscometer for measuring the viscosity of the refrigerant. In a DC superconducting cable 300 shown in FIG. 30B, conductors 300a and 300b each include a stainless steel former 301, an oxide superconducting tape 302 and a PPLP insulation layer 307. A sheath 308 housing two conductors 300a and 300b is formed of a stainless steel former 303, a super insulation 304, a vacuum layer 305 and an outer pipe 309. Refrigerant on the go passage flows in former 301 of each of the conductors 300a and 300b and refrigerant on the return passage flows between conductors 300a and 300b and sheath 308. In this cable, the refrigerant on the return passage functions as a thermal shield for the refrigerant on the go passage. The cooling system in FIG. 30A has a structure similar to that of the system in FIG. 29A.

The present invention is applicable to other superconducting equipment shown below as well as cables.

Figure 31:
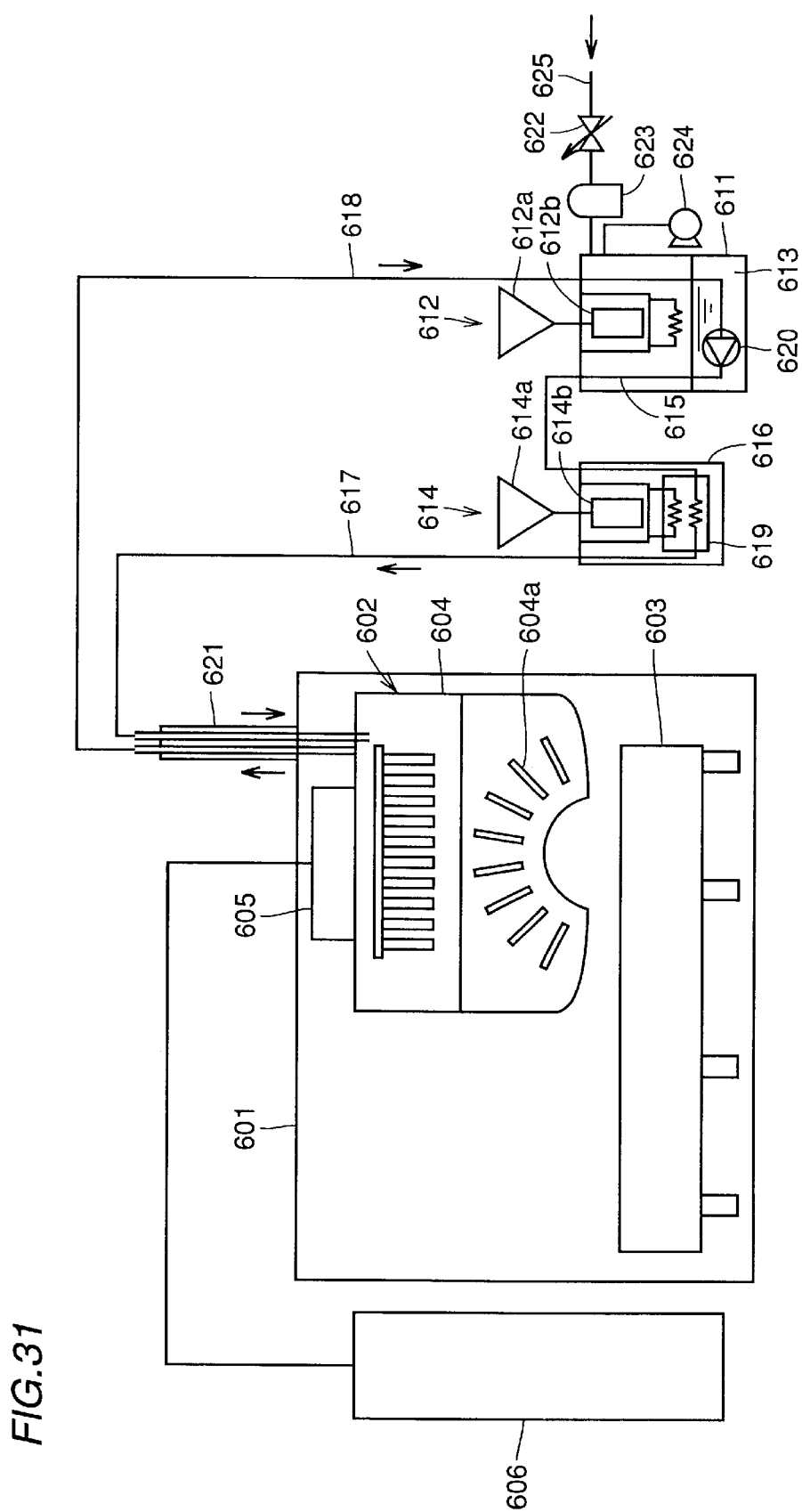
FIG. 31 schematically illustrates a cooling system for an SQUID according to the present invention.

FIG. 31 illustrates a 61-channel magnetoencephalography meter using a superconducting quantum interference device (SQUID). A detecting unit 602 of the magnetoencephalography meter placed in a magnetic shielding room 601 is composed of an SQUID 604 having a detection coil 604a for measuring the brain wave of a subject lying on a bed 603. The measured brain signals are counted by the SQUID circuit. The SQUID circuit is connected to an externally located drive circuit 606 via a preamplifier 605 in shielding room 601. The distribution of the counted digital signals undergo noise processing, D/A conversion, and three-dimensional waveform shaping at a computer to output a brain waveform. According to the present invention, a system for cooling the SQUID is provided. As shown in FIG. 31, the refrigerant for cooling SQUID 604 is supplied from a cooling system independent of detection unit 602. In this cooling system, air in the atmosphere is introduced into a thermal insulation tank 611 through a valve 622 and a purifying unit 623 placed at a piping system 625. An exhausting pump 624 is connected to tank 611. A cooling head (functioning as a condenser) of a GM refrigerator 612 having a compressor 612a and a piston 612b are arranged at tank 611, and the introduced air is condensed by the cooling head. Liquefied air 613 held by tank 611 is transported by a pump 620 to another vessel 616 via a piping 615 and further cooled by a GM refrigerator 614 having a compressor 614a and a piston 614b via a heat exchanger 619. The liquid air thus supercooled is discharged by pump 620 via a piping 617. The transportation by pump 620 contributes to maintenance of the fluid state of the supercooled refrigerant. The discharged refrigerant is sent to SQUID 604 via a service port 621 to cool high temperature superconducting coil 604a for the detection. The refrigerant with its temperature increased at SQUID 604 is returned to tank 611 via service port 621 and a piping 618. The returned refrigerant is cooled by refrigerator 612 and transported again to SQUID 604. The supercooled refrigerant is thus circulated. The refrigerant vaporized in thermal insulation tank 611 can be condensed at the cooling head. In such a cooling system, instead of liquefying air, liquid nitrogen or a mixture of liquid oxygen and liquid nitrogen may be introduced into tank 611 for implementing supercooling. In the system shown in FIG. 31, a Stirling cycle refrigerator or a Brayton cycle refrigerator may be used instead of the GM refrigerator.

In the system shown in FIG. 31, as the refrigerator is placed apart from the SQUID, the influence of mechanical vibration noise and electrical noise from the refrigerator can be neglected. Compared with conventional systems, this system can have reduced burden of noise signal processing. This would provide the possibility of processing very weak signals with higher resolution and provide highly advanced image information. Further, compared with conventional system in which the head of the refrigerator is arranged at the detection unit, this system can provide a much simpler structure. The refrigerating system which is independent of the detection unit makes the maintenance of the apparatus easier. Compared with a direct thermal conduction cooling system employing a refrigerator, this system which uses liquid refrigerant has higher cooling capacity and can provide enough protection against partial heat generation and heat invasion from the outside. This system also assures a sufficient stability of cooling temperature. Compared with the conventional type (4.2 K), this system has a considerably higher cooling temperature. However, by utilizing a temperature significantly lower than 77 K, for example, the temperature in the range from 40 to 60 K, thermal noise can be restricted and practical detection sensitivity and resolution can be achieved. The refrigerant used in this system is cheaper than liquid helium.

Figure 32:
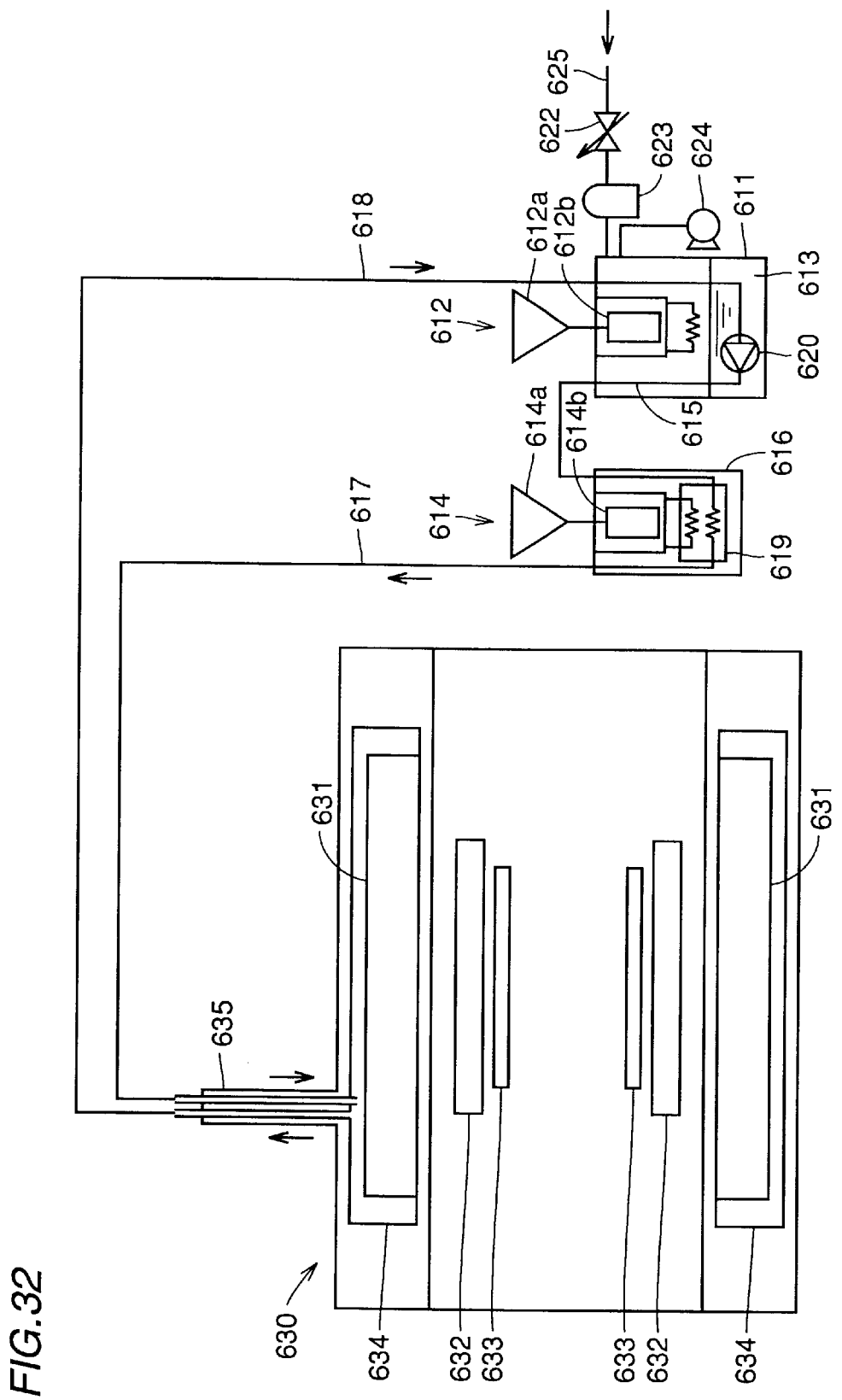
FIG. 32 schematically illustrates a cooling system for an MRI according to the present invention.

FIG. 32 illustrates a superconducting magnet system for magnetic resonance imaging (MRI) employing the cooling system shown in FIG. 31. A magnet system 630 includes a magnetostatic field coil 631 which applies a stable magnetostatic field, a gradient magnetic field coil 632 which applies a gradient magnetic field to the measurement region, and a radio wave transmission/reception probe 633 which collect signals. A high temperature superconductor is used for the coil. The superconducting coil is cooled by refrigerant in a vessel 634. Magnet system 630 is cooled by a cooling system similar to that shown in FIG. 31. Supercooled refrigerant is sent from the cooling system to the coil via a service port 635. The refrigerant departing from the magnet is returned to a thermal insulation tank 611. In such a cooling system, in stead of liquefying the air, liquid nitrogen or a mixture of liquid oxygen and liquid nitrogen may be introduced into tank 611 for accomplishing supercooling. This magnet system achieves similarly to the SQUID advantages such as reduction of noise, simplified signal processing, simple structure, easy maintenance, high cooling capacity, high resolution, high image quality, and the like. This system is also advantageously applicable not only to image processing for the whole body but to a small-sized MRI system for obtaining a localized CT image such as that of arm, leg or the like. The reduced cooling cost owing to use of cheap refrigerant makes this system advantageous for a small-sized apparatus.

Figure 33:
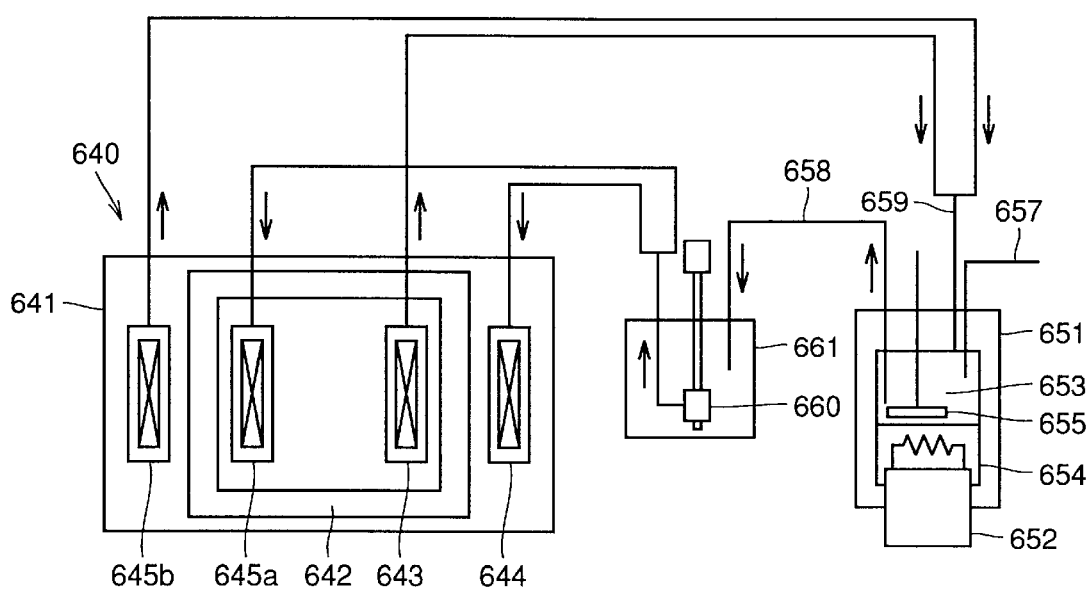
FIG. 33 schematically illustrates a cooling system for a transformer according to the present invention.

FIG. 33 illustrates a cooling system for a high temperature superconducting transformer according to the present invention. Transformer 640 includes a core 642, a primary winding 643 and a secondary winding 644 housed in a vacuum thermal insulation vessel 641. A heat exchanger 654 connected to a refrigerator 652 is arranged in a refrigerant storage vessel 651. Depending on the size of the transformer, a GM refrigerator, a Stirling cycle refrigerator (for middle-size) or a Brayton cycle refrigerator (for large-size) is used as refrigerator 652. Refrigerant is introduced to vessel 651 via a piping 657, and refrigerant 653 is stirred by a screw 655. Refrigerant 653 with its fluid state maintained by the stirring is supercooled by heat exchanger 654. A condenser (not shown) may be placed in storage vessel 651 to liquefy gas in storage vessel 651 in order to prepare refrigerant. Refrigerant 653 in storage vessel 651 is sent to a vessel 661 housing a pump 660 via a double tube 658. Refrigerant 653 is transported by pump 660 from vessel 661 to shield vessels 645a and 645b housing primary winding 643 and secondary winding 644. Each winding is cooled by the supercooled liquid refrigerant. Refrigerant passing through windings 643 and 644 is returned to storage vessel 651 via a piping 659 and cooled again. The windings can be cooled by the supercooled liquid refrigerant to 40 K, for example. By cooling the windings by liquid, heat generated due to AC energizing can sufficiently be reduced. When a winding of a silver-sheathed bismuth-based oxide superconducting tape is cooled to 40 K, a Jc which is approximately five times as high as that obtained by cooling at 77 K can be maintained. This is advantageous for a practical transformer. If initial cooling is done as shown in FIG. 33, a preliminary cooling process as performed in the conventional method is not required and a liquid nitrogen tank for shield may be unnecessary in a vacuum thermal insulation vessel which houses the windings. This may provide a compact apparatus. Further, since the refrigerator is placed apart from the windings, the refrigerator is hardly affected by the magnetic field so that troubles can be prevented. Maintenance of the refrigerator may also be easier.

Figure 34:
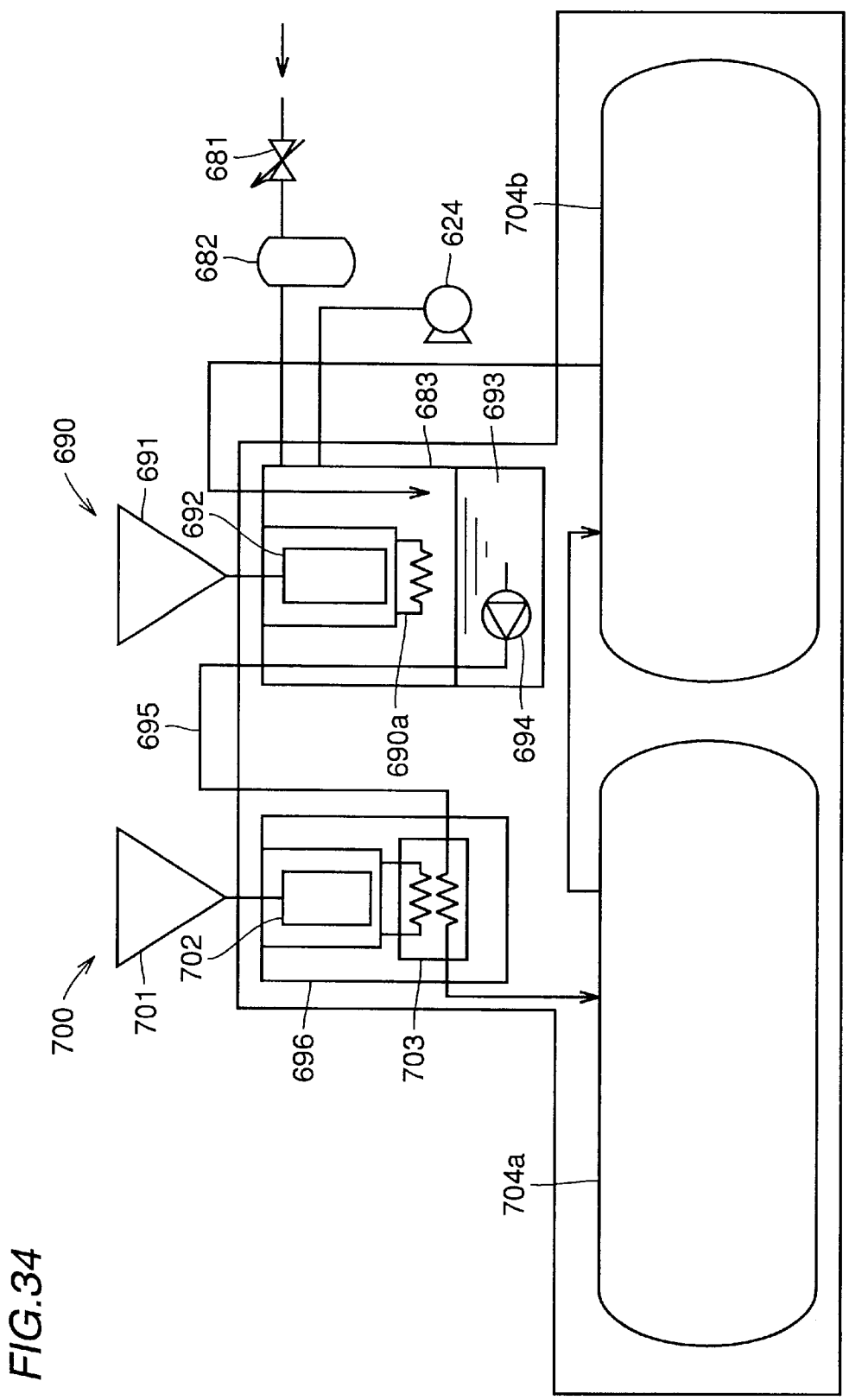
FIG. 34 schematically illustrates an embodiment of the cooling system for a linear motor car according to the present invention.

FIG. 34 illustrates a cooling system for a linear motor car. Air in the atmosphere is introduced into a tank 683 through a valve 681 and a purifying unit 682. An exhausting pump 684 is connected to tank 683. A cooling head 690a of a GM refrigerator 690 having a compressor 691 and a piston 692 is arranged at tank 683, and the introduced air is condensed by cooling head 690a. Liquefied air 693 held by tank 683 is sent by a pump 694 to another vessel 696 via a piping 695, and further cooled by a GM refrigerator 700 having a compressor 701 and a piston 702 via a heat exchanger 703. Liquid air 693 which is supercooled is sent to vessels 704a and 704b housing high temperature superconducting coils and then returned to tank 683. The supercooled refrigerant is circulated in this way. In such a cooling system, instead of liquefying the air, liquid nitrogen or a mixture of liquid oxygen and liquid nitrogen may be introduced into tank 611 to be supercooled.

Figure 35:
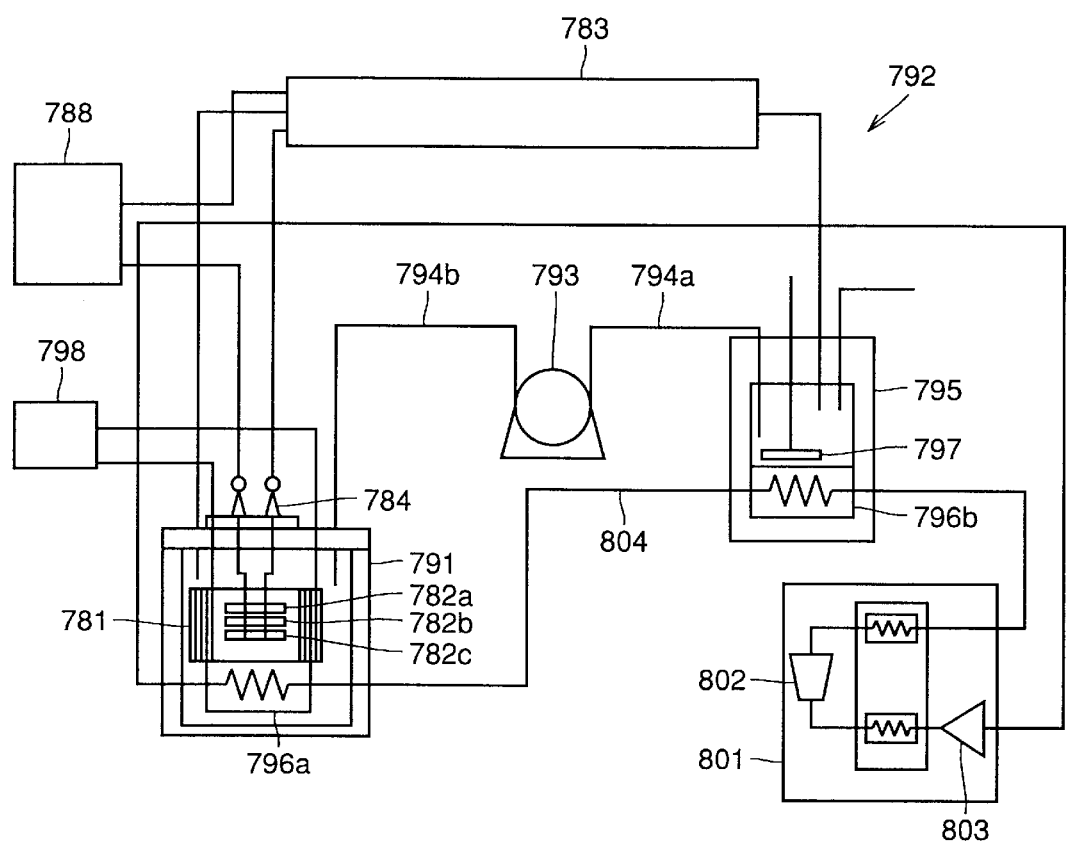
FIG. 35 schematically illustrates an embodiment of the cooling system for a current limiter according to the present invention.

A current limiter can be incorporated into a cooling system as shown in FIG. 35. The load and the current limiter are cooled in this cooling system by common circulating refrigerant. Current limiting elements 782a, 782b and 782c and a coil 781 are housed in an FRP vessel 791 of thermal insulation type. Coil 781 for applying magnetic field to elements 782a to 782c is a bismuth-based 2223-phase oxide superconducting coil, for example. In this system, one coil applies the magnetic field to the three current limiting elements. The three current limiting elements are connected in series to a cable load 783 and a power supply 788 via a bushing 784. A heat exchanger 796a is further housed in vessel 791. Coil 781 is connected to another power supply 798. The refrigerant which cools cable 783, current limiting elements 782a to 782c and coil 781 is forced to circulate by a pump 793 in a piping system 792 passing through cable 783 and vessel 791. The refrigerant is sent by pump 793 through a double tube 794a to a tank 795. A heat exchanger 796b is placed for cooling in tank 795. Further, a screw 797 for stirring the refrigerant is placed in tank 795. The refrigerant departing from tank 795 is sent to cable load 783. The refrigerant is transported from cable load 783 to FRP vessel 791 to cool current limiting elements 782a to 782c and coil 781. The refrigerant departing from vessel 791 is sent to pump 793 via a double tube 794b. In this system, the refrigerant is cooled by a Brayton cycle refrigerator 801. Brayton cycle refrigerator 801 includes an expansion turbine 802 for adiabatic expansion of helium gas and a compressor 803 for adiabatic compression thereof. Helium gas is circulated in the refrigerating cycle via a piping system 804. Heat exchangers 796a and 796b for cooling are arranged at piping system 804. When the refrigerant is flown by forcible circulation in such a cooling system, the refrigerant can be kept in fluid state at a temperature equal to or lower than the original freezing point or triple point of the refrigerant in its stationary state. If refrigerant in the supercooled state is used for cooling, a higher Jc can be achieved in the superconductor. If the superconducting cable is used for loading, such a supercooled state is more advantageous. When the temperature of the refrigerant is set at or below the original freezing point or triple point of the refrigerant in the cooling system, it is preferable that means for monitoring the viscosity of the refrigerant and means for measuring the flow rate of the refrigerant are placed at the piping system. As the refrigerant for the load and current limiting system, liquid nitrogen, liquid air, a mixture of liquid nitrogen and liquid oxygen, or the like can be used. Gaseous air may be supplied to tank 795 to liquefy the air by cooling it via heat exchanger 796b. The liquefied air is circulated by pump 793.

Figure 36:
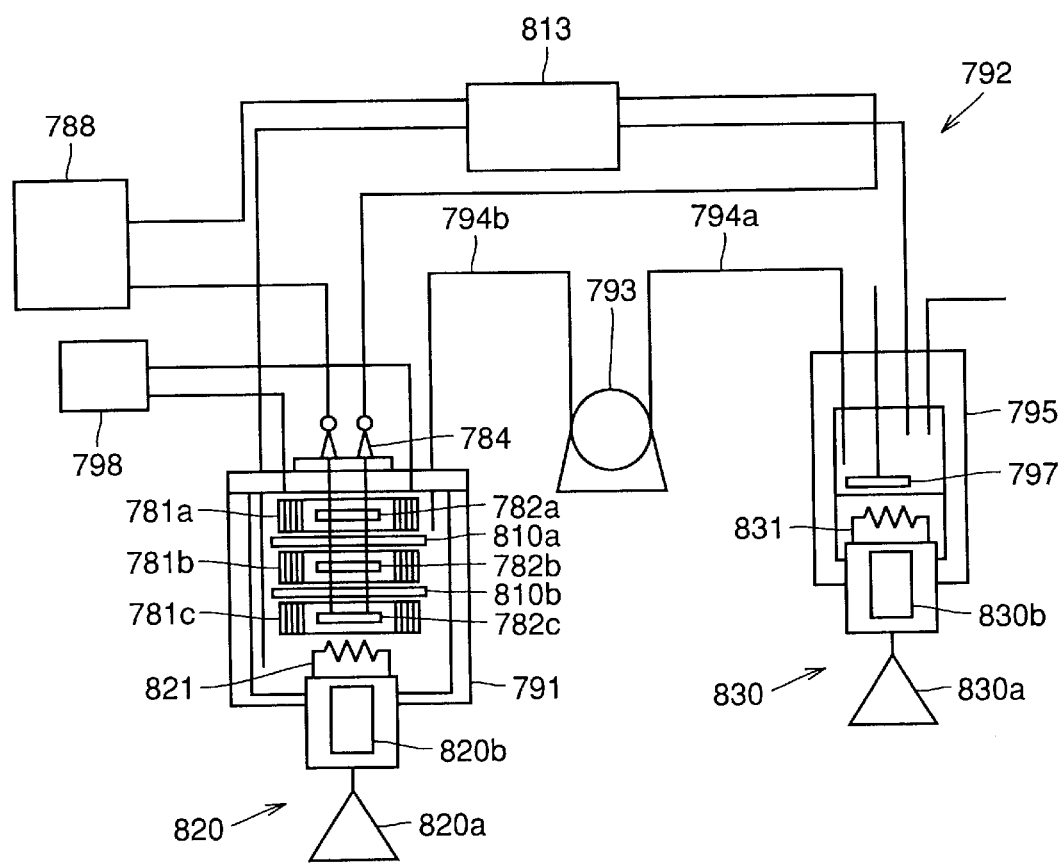
FIG. 36 schematically illustrates another embodiment of the cooling system for a current limiter according to the present invention.

A current limiter may be incorporated into the cooling system as shown in FIG. 36. In this cooling system, the load and the current limiter are cooled by common circulating refrigerant. Current limiting elements 782a, 782b and 782c and associated coils 781a, 781b and 781c are housed in an FRP vessel 791 of thermal insulation type. Shielding steel plates 810a and 810b are respectively placed between adjacent elements, so that each element is operated independently. Coils 781a to 781c for applying magnetic field respectively to elements 782a to 782c are bismuth-based 2223-phase oxide superconducting coils, for example. The three current limiting elements are connected in series to superconducting equipment 813 and a power supply 788 via a bushing 784. A heat exchanger 821 of a GM refrigerator 820 having a compressor 820a and a piston 820b is further housed in vessel 791. Coils 781a to 781c are connected to another power supply 798. The refrigerant is forced to circulate by a pump 793 in a piping system 792. The refrigerant is sent by pump 793 through a double tube 794a to a tank 795. A heat exchanger 831 of a GM refrigerator 830 having compressors 830a and 830b is housed in tank 795. A screw 797 is further placed in tank 795 for stirring the refrigerant. The refrigerant departing from tank 795 is sent to superconducting equipment 813. The refrigerant is transported from superconducting equipment 813 to FRP vessel 791 to cool current limiting elements 782a to 782c and coils 781a to 781c. The refrigerant departing from vessel 791 is sent to pump 793 via a double tube 794b. In this system, the refrigerant in vessel 791 and the refrigerant in tank 795 are cooled independently by the GM refrigerators. This cooling system is simpler and easier to use than that shown in FIG. 35 and accordingly suitable for a relatively small-sized load. In such a cooling system, the refrigerant flown by forcible circulation can be maintained in a fluid state at a temperature equal to or below the original freezing point or triple point of the refrigerant in a stationary state. The refrigerant in a supercooled state can bring a higher Jc to the superconductor. When the temperature of the refrigerant is set at or below the original freezing point or triple point in the cooling system, it is preferable that means for monitoring the viscosity of the refrigerant and means for measuring the flow rate of the refrigerant are placed at the piping system. As the refrigerant for the load and the current limiting system, liquid nitrogen, liquid air, a mixture of liquid nitrogen and liquid oxygen or the like can be used. Gaseous air may be supplied to tank 95 to liquefy the air by cooling it via heat exchanger 831. The liquefied air is circulated by pump 793.

Although the current limiting element and coil are simultaneously cooled by the same refrigerant in the cooling system discussed above, the current limiting element and coil may be cooled respectively by separate cooling systems. The load and current limiting system may be cooled respectively by separate cooling systems. In this case, it is preferable to cycle the refrigerant.

The cooling method and the cooling system according to the present invention are applicable to a cooling apparatus for a logic element circuit employing a high temperature superconducting thin film and a high-speed computer using it. In this case, the cost of cooling may considerably be reduced compared with that of a cryogenic superconducting circuit computer which uses conventional liquid helium (4.2 K).

INDUSTRIAL APPLICABILITY

According to the present invention, a superconductor can be cooled to a temperature region which achieves a higher Jc by lowering the freezing point of refrigerant. According to the present invention, a cooling temperature which is lower than the conventional one can be accomplished relatively easily at a lower cost. The present invention is applicable advantageously to high temperature superconducting cables, transformers, current limiters, various AC coils employed in SMES and the like, and various DC coils employed for SQUIDs, MRIs, magnetic separation, linear motor cars and the like.

In the present invention, the air which unlimitedly exists can be liquefied in situ for using it as a refrigerant to cool a superconductor. In the present invention, a superconductor can be cooled basically without using a refrigerant which has been separated and purified previously at other places, so that the effect of energy saving and environmental protection can be achieved. If the size of the refrigerator is made large as required, a large-scale superconductor can be cooled. According to the present invention, the refrigerant can be obtained in situ, so that geographic problems involved in the arrangement of magnets or cables may be avoided. The present invention is advantageous for cooling superconducting equipment including superconducting magnets, energy storage magnet systems, transformers, and the like.

What is claimed is:

1. A method of cooling a superconductor by a refrigerant comprising the steps of:

cooling the refrigerant to or below a freezing point which is given by the refrigerant having a stationary state in a cooling system for the superconductor;

maintaining the refrigerant having a temperature equal to or lower than the freezing point in a fluid state by a physical action on the cooled refrigerant; and cooling the superconductor to or below a critical temperature of the superconductor by the refrigerant in the fluid state.

2. The cooling method according to claim 1, further comprising the steps of:

measuring viscosity of the refrigerant; and modulating a flow rate of the refrigerant in the fluid state according to the measured viscosity.

3. The cooling method according to claim 2, wherein the step of measuring the viscosity is performed by evaluating a load applied to a stirring motor which is stirring the refrigerant.

4. The cooling method according to claim 1, wherein the physical action on the refrigerant comprises stirring of the refrigerant.

5. The cooling method according to claim 1, wherein the physical action on the refrigerant comprises transfer or circulation of the refrigerant via a pump.

6. The cooling method according to claim 1, wherein the physical action on the refrigerant comprises stirring of the refrigerant in a vessel which holds the refrigerant or transfer or circulation of the refrigerant via a pump, the refrigerant is cooled by a refrigerator or a refrigerating system, and the refrigerant in the fluid state having the temperature equal to or lower than the freezing point is sent by a pump via a piping system from the vessel to a portion which houses the superconductor.

7. The cooling method according to claim 6, wherein the superconductor is a part of a device selected from the group consisting of a transformer, a linear motor car, an SMES, an MRI, an SQUID, a logic circuit and a current limiter, and the refrigerant is sent from the cooling system independent of an operation unit of the device to the operation unit via the piping system.

8. The cooling method according to claim 1, wherein the physical action on the refrigerant comprises convection of the refrigerant in a vessel.

9. The cooling method according to claim 1, wherein the refrigerant is selected from the group consisting of liquid nitrogen and a mixture of liquid nitrogen and solid nitrogen.

10. The cooling method according to claim 1, wherein the refrigerant is selected from the group consisting of liquid air and a mixture of liquid air and solid air.

11. The cooling method according to claim 1, wherein the refrigerant is selected from the group consisting of a mixture of liquid oxygen and liquid nitrogen, and a mixture of liquid oxygen, liquid nitrogen and a solidified matter of at least one of liquid oxygen and liquid nitrogen.

12. The cooling method according to claim 1, wherein the superconductor constitutes at least one selected from the group consisting of an oxide high temperature superconducting cable, an oxide high temperature superconducting magnet, and an oxide high temperature superconducting device.

13. The cooling method according to claim 1, wherein the superconductor comprises an oxide high temperature superconducting cable, and the step of cooling the refrigerant is performed at a plurality of places in the cooling system for the oxide high temperature superconducting cable.

14. The cooling method according to claim 1, wherein the refrigerant comprises air and the method further comprising the steps of:

liquefying air by a refrigerator;

circulating the liquefied air while cooling it; and cooling the superconductor by the cooled and circulated liquefied air.

15. The cooling method according to claim 14, wherein circulating the liquefied air comprises transferring of the liquefied air by mechanical means, or by convection of the liquefied air held in a vessel.

16. The cooling method according to claim 14, wherein the circulating step includes cycling between vaporization of the liquefied air to produce vaporized air and condensation of the vaporized air by cooling.

17. The cooling method according to claim 14, wherein the refrigerator uses a refrigerating cycle in which gas is compressed and expanded, and the air is cooled and allowed to condense by the gas circulated in the refrigerating cycle.

18. The cooling method according to claim 17, wherein the gas expanded in the refrigerating cycle cools the circulated liquefied air and cools the air for condensation.

19. The cooling method according to claim 17, wherein the refrigerating cycle comprises a Brayton cycle.

20. The cooling method according to claim 17, wherein the gas used in the refrigerating cycle comprises helium gas.

21. The cooling method according to claim 14, further comprising the step of removing from the air a gaseous material which solidifies at a temperature higher than a liquefying temperature of the air, wherein the resulting air is liquefied by the refrigerator.

22. The cooling method according to claim 14, further comprising the step of adding to the liquefied air a material for lowering a freezing point of the liquefied air.

23. The cooling method according to claim 22, wherein the material for lowering the freezing point comprises a petroleum-based organic solvent or zeolite.

24. The cooling method according to claim 14, further comprising the step of adding liquid oxygen to the liquefied air to form a refrigerant mixture, wherein the refrigerant mixture is used for cooling the superconductor.

25. The cooling method according to claim 14, wherein a cooling storage type refrigerator is used to condense the air or cool the circulated liquefied air.

26. An apparatus for cooling, by a refrigerant, a superconductor which is placed in the refrigerant, comprising:

a refrigerating apparatus or refrigerating system for cooling the refrigerant to or below a freezing point which is given by the refrigerant having a stationary state in the cooling system of the superconductor;

means for allowing the refrigerant cooled to or below the freezing point to flow;

means for measuring viscosity of the refrigerant; and means for modulating a fluid state of the refrigerant according to the measured viscosity.

27. The cooling apparatus according to claim 26, wherein the means for allowing the refrigerant to flow comprises at least one selected from the group consisting of a pump and a stirring machine.

28. The cooling apparatus according to claim 26, further comprising:

a refrigerator having a cryogenic part exhibiting a temperature lower than a liquefying temperature of air;

a liquefied air storage vessel housing therein at least a part of the cryogenic part;

a first piping system for discharging the liquefied air stored in the vessel therefrom;

a second piping system for directing the discharged liquefied air to the superconductor and circulating the liquefied air; and means placed at the second piping system for cooling the liquefied air supplied to the superconductor.

29. The cooling apparatus according to claim 28, wherein a valve is placed at the first piping system, and a pump is placed at the second piping system for pumping the liquefied air.

30. The cooling apparatus according to claim 28, wherein the refrigerator uses a refrigerating cycle in which gas is circulated through a compression and expansion region, and a heat exchanger for cooling the liquefied air or the liquefied air storage vessel is placed at the cryogenic part of the refrigerator through which the expanded gas passes.

31. The cooling apparatus according to claim 30, wherein the refrigerating cycle comprises a Brayton cycle.

32. The cooling apparatus according to claim 30, wherein the gas used in the refrigerating cycle comprises helium gas.

33. The cooling apparatus according to claim 28, wherein
a purifying unit for removing from air a gaseous material which solidifies at a temperature higher than the liquefying temperature of the air is further placed in a system for supplying the air to the liquefied air storage vessel.

34. The cooling apparatus according to claim 28, wherein
a heat exchanging fin is further placed at the cryogenic part of the refrigerator housed in the liquefied air storage vessel.

35. The cooling apparatus according to claim 28, wherein
a heater is further placed at the cryogenic part of the refrigerator housed in the liquefied air storage vessel, and
an exhausting unit is connected to the liquefied air storage vessel.

36. The cooling apparatus according to claim 28, further comprising:
means for injecting into the vessel an additive for lowering the freezing point of the liquefied air; and
means for stirring the liquefied air containing the additive.

37. The cooling apparatus according to claim 28, further comprising means for introducing liquid oxygen into the vessel.

38. The cooling apparatus according to claim 28, wherein
a cooling stage of a cooling storage type refrigerator is placed in the vessel so as to condense the air in the vessel, and a cooling stage of a cooling storage type refrigerator is placed at the second piping system so as to cool the liquefied air.

39. The cooling apparatus according to claim 26, further comprising:
a refrigerator having a cryogenic part exhibiting a temperature lower than a liquefying temperature of air; and
a vessel which simultaneously houses therein at least a part of the cryogenic part and a superconductor to be cooled, wherein
the vessel holds liquefied air for cooling the superconductor, and convection of the liquefied air occurs in the vessel between the cryogenic part and the superconductor, or vaporization of the liquefied air and condensation of the vaporized air by the cryogenic part occur in the vessel.

40. The cooling apparatus according to claim 39, wherein the refrigerator is Brayton cycle type, Stirling type, GM type, Solvay type, or any combination thereof.

41. The cooling apparatus according to claim 39, wherein the refrigerator uses a refrigerating cycle in which gas is circulated through a compression and an expansion regions, and
a heat exchanger for cooling the liquefied air is placed at the cryogenic part of the refrigerator through which the expanded gas passes.

42. The cooling apparatus according to claim 39, further comprising a purifying unit for removing from air a gaseous material which solidifies at a temperature higher than the liquefying temperature of the air.

43. The cooling apparatus according to claim 39, wherein
a heat exchanging fin is placed at the cryogenic part in the vessel.

44. The cooling apparatus according to claim 39, wherein
a heater is placed at the cryogenic part in the vessel and an exhausting unit is connected to the vessel.

45. The cooling apparatus according to claim 39, further comprising:
means for injecting into the vessel an additive for lowering the freezing point of the liquefied air; and
means for stirring the liquefied air containing the additive.

46. The cooling apparatus according to claim 39, further comprising means for introducing liquid oxygen into the vessel.

47. A cooling method for a superconductor comprising the steps of:
liquefying air or a mixture of nitrogen and oxygen by a refrigerator, wherein the refrigerator employs a refrigerating cycle for its cooling function, and the air or the mixture is cooled outside the refrigerating cycle via a cooling part placed on the refrigerating cycle;
circulating the liquefied air or the mixture, optionally while cooling it; and
cooling the superconductor by the circulated the liquefied air or the mixture.

48. The cooling method according to claim 47, wherein
the circulation is caused by transfer of the liquefied air or the mixture by mechanical means, or by convection of the liquefied air or the mixture held in a vessel.

49. The cooling method according to claim 47, wherein
the circulation is a cycle between vaporization of the liquefied air or the mixture and condensation of the vaporized air or the mixture by cooling thereof.

50. The cooling method according to claim 47, wherein
the refrigerator uses a refrigerating cycle for circulating a gas, said gas being compressed and expanded, and
the air or the mixture of nitrogen and oxygen is cooled and allowed to condense by the gas circulated in the refrigerating cycle via the cooling part.

51. The cooling method according to claim 50, wherein
the gas expanded in the refrigerating cycle cools the circulated liquefied air or the mixture of nitrogen and oxygen for condensation.

52. The cooling method according to claim 50, wherein the refrigerating cycle comprises Brayton cycle.

53. The cooling method according to claim 50, wherein the gas used in the refrigerating cycle comprises helium gas.

54. The cooling method according to claim 47, further comprising the step of removing from the air or the mixture of nitrogen and oxygen a gaseous material which solidifies at a temperature higher than the liquefying temperature of the air or the mixture, wherein the resulting air or mixture of nitrogen and oxygen is liquefied by the refrigerator.

55. The cooling method according to claim 47, further comprising the step of adding to the liquefied air or the mixture a material for lowering a freezing point of the liquefied air or the mixture.

56. The cooling method according to claim 55, wherein the material for lowering the freezing point comprises petroleum-based organic solvent or zeolite.

57. The cooling method according to claim 47, further comprising the step of modulating the composition of the liquefied air or the mixture.

58. The cooling method according to claim 47, further comprising the step of adding liquid oxygen to the liquefied air or the mixture, wherein the resulting refrigerant mixture is used for cooling the superconductor.

59. The cooling method according to claim 47, wherein a cooling head of a cooling storage type refrigerator is used to condense the air or the mixture of nitrogen and oxygen or cool the circulated liquefied air or the mixture.

60. A cooling apparatus for a superconductor comprising:
- a refrigerator employing a refrigerating cycle for its cooling function, and having, on the refrigerating cycle, a cryogenic part which exhibits a temperature lower than a liquefying temperature of air or a mixture of nitrogen and oxygen;
- a vessel housing therein at least a part of the cryogenic part;
- a first piping system for discharging the liquefied air or mixture of nitrogen and oxygen stored in the vessel therefrom;
- a second piping system for directing the discharged liquefied air or the mixture to the superconductor and circulating the liquefied air or the mixture; and
- means placed at the second piping system for cooling the liquefied air or the mixture supplied to the superconductor, wherein
  - the air or the mixture of nitrogen and oxygen in the vessel is cooled to be liquefied outside the refrigerating cycle via the cryogenic part, and
  - the superconductor is cooled by the liquefied air or mixture of nitrogen and oxygen.

61. The cooling apparatus according to claim 60, wherein
a valve is placed at the first piping system, and
a pump is placed at the second piping system for pumping the liquefied air or mixture of nitrogen and oxygen.

62. The cooling apparatus according to claim 60, wherein the refrigerator uses a refrigerating cycle in which gas is circulated through a compression and expansion region, and
- a heat exchanger for cooling the liquefied air or mixture of nitrogen and oxygen or the vessel is placed at the cryogenic part of the refrigerator through which the expanded gas passes.

63. The cooling apparatus according to claim 62, wherein the refrigerating cycle comprises a Brayton cycle.

64. The cooling apparatus according to claim 62, wherein the gas used in the refrigerating cycle comprises helium gas.

65. The cooling apparatus according to claim 60, wherein a purifying unit for removing from the air or the mixture of nitrogen and oxygen a gaseous material which solidifies at a temperature higher than the liquefying temperature of the air or the mixture is further placed in a system for supplying the air or the mixture to the vessel.

66. The cooling apparatus according to claim 60, wherein a heat exchanging fin is further placed at the cryogenic part of the refrigerator housed in the vessel.

67. The cooling apparatus according to claim 60, wherein a heater is further placed at the cryogenic part of the refrigerator housed in the vessel, and
an exhausting unit is connected to the vessel.

68. The cooling apparatus according to claim 60, further comprising:
means for injecting into the vessel an additive for lowering a freezing point of the liquefied air or mixture of nitrogen and oxygen; and
means for stirring the liquefied air or mixture of nitrogen and oxygen containing the additive.

69. The cooling apparatus according to claim 60, further comprising means for modulating the composition of the liquefied air or the mixture.

70. The cooling apparatus according to claim 60, further comprising means for introducing liquid oxygen into the vessel.

71. The cooling apparatus according to claim 60, wherein
a cooling stage of a cooling storage type refrigerator is placed in the vessel so as to condense the air or the mixture in the vessel, and a cooling stage of a cooling storage type refrigerator is placed at the second piping system so as to cool the liquefied air or mixture.

72. A cooling apparatus for a superconductor comprising:
- a refrigerator employing a refrigerating cycle for its cooling function, and having, on the refrigerating cycle, a cryogenic part exhibiting a temperature lower than a liquefying temperature of air or a mixture of nitrogen and oxygen; and
- a vessel which simultaneously houses therein at least a part of the cryogenic part and a superconductor to be cooled, wherein
  - the vessel holds liquefied air or mixture of nitrogen and oxygen for cooling the superconductor, and convection of the liquefied air or mixture occurs in the vessel between the cryogenic part and the superconductor, or vaporization of the liquefied air or mixture and condensation of the vaporized air or mixture by the cryogenic part occur in the vessel.

73. The cooling apparatus according to claim 72, wherein the refrigerator is Brayton cycle type, Stirling type, GM type, Solvay type, or any combination thereof.

74. The cooling apparatus according to claim 72, wherein the refrigerator uses a refrigerating cycle in which gas is circulated through a compression and expansion regions, and
- a heat exchanger for cooling the liquefied air or mixture is placed at the cryogenic part of the refrigerator through which the expanded gas passes.

75. The cooling apparatus according to claim 72, further comprising a purifying unit for removing from the air or the mixture of nitrogen and oxygen a gaseous material which solidifies at a temperature higher than the liquefying temperature of the air or the mixture.

76. The cooling apparatus according to claim 72, wherein a heat exchanging fin is placed at the cryogenic part in the vessel.

77. The cooling apparatus according to claim 72, wherein
a heater is placed at the cryogenic part in the vessel and an exhausting unit is connected to the vessel.

78. The cooling apparatus according to claim 72, further comprising:
means for injecting into the vessel an additive for lowering a freezing point of the liquefied air or the mixture of nitrogen and oxygen; and
means for stirring the liquefied air or the mixture of nitrogen and oxygen containing the additive.

79. The cooling apparatus according to claim 72, further comprising means for modulating the composition of the liquefied air or the mixture of nitrogen and oxygen.

80. The cooling apparatus according to claim 72, further comprising means for introducing liquid oxygen into the vessel.

* * * * *